United States Patent
Miura

(10) Patent No.: US 9,374,564 B2
(45) Date of Patent: *Jun. 21, 2016

(54) ILLUMINATION UNIT, PROJECTION DISPLAY UNIT, AND DIRECT VIEW DISPLAY UNIT

(71) Applicant: Sony Corporation, Tokyo (JP)

(72) Inventor: Koji Miura, Tokyo (JP)

(73) Assignee: Sony Corporation, Tokyo (JP)

( * ) Notice: Subject to any disclaimer, the term of this patent is extended or adjusted under 35 U.S.C. 154(b) by 71 days.

This patent is subject to a terminal disclaimer.

(21) Appl. No.: 14/296,986

(22) Filed: Jun. 5, 2014

(65) Prior Publication Data

US 2014/0285773 A1  Sep. 25, 2014

Related U.S. Application Data

(63) Continuation of application No. 13/276,818, filed on Oct. 19, 2011, now Pat. No. 8,770,761.

(30) Foreign Application Priority Data

Nov. 26, 2010  (JP) .................................. 2010-263735

(51) Int. Cl.
  *H04N 9/31* (2006.01)
  *F21K 99/00* (2016.01)
  *F21V 5/00* (2015.01)

(52) U.S. Cl.
  CPC ................ *H04N 9/3138* (2013.01); *F21K 9/00* (2013.01); *F21V 5/007* (2013.01); *F21V 5/008* (2013.01); *H04N 9/315* (2013.01)

(58) Field of Classification Search
  CPC ........... F21K 9/00; F21V 5/007; F21V 5/008; H04N 9/3138; H04N 9/315; H04N 9/3197
  See application file for complete search history.

(56) References Cited

U.S. PATENT DOCUMENTS

| 8,770,761 B2 * | 7/2014 | Miura | .................... H04N 9/315 257/72 |
|---|---|---|---|
| 2005/0018141 A1 | 1/2005 | Hosaka | |

(Continued)

FOREIGN PATENT DOCUMENTS

| CN | 1914520 | 2/2007 |
|---|---|---|
| EP | 1 184 706 | 3/2002 |

(Continued)

OTHER PUBLICATIONS

Extended European Search Report issued Apr. 4, 2013 in corresponding European Patent Application No. 12007938.9.

(Continued)

*Primary Examiner* — Sultan Chowdhury
*Assistant Examiner* — Magda Cruz
(74) *Attorney, Agent, or Firm* — K&L Gates LLP

(57) ABSTRACT

An illumination unit includes one or more light sources each including a solid-state light-emitting device configured to emit light from a light emission region including a single or a plurality of light-emitting spots. The solid-state light-emitting device includes a single chip or a plurality of chips each emitting a light beam. Three or more of the light-emitting spots are provided within the whole of one or more light sources, to allow the whole of one or more light sources to emit light beams in two or more wavelength bands different from one another, and the solid-state light emitting device in a first light source which is at least one of the one or more light sources, has a plurality of light-emitting spots which emit light in the same wavelength band.

12 Claims, 23 Drawing Sheets

(56) References Cited

U.S. PATENT DOCUMENTS

| | | | |
|---|---|---|---|
| 2005/0174775 A1* | 8/2005 | Conner | G02B 27/0994 362/268 |
| 2007/0253197 A1 | 11/2007 | Kung et al. | |
| 2008/0316439 A1 | 12/2008 | Conner | |
| 2012/0133901 A1 | 5/2012 | Miura | |

FOREIGN PATENT DOCUMENTS

| | | |
|---|---|---|
| EP | 1 347 653 | 9/2003 |
| EP | 1 816 512 | 8/2007 |
| JP | 11-260144 | 9/1999 |
| JP | 2000-347291 | 12/2000 |
| JP | 2001-013462 | 1/2001 |
| JP | 2004-191735 | 7/2001 |
| JP | 2002-072132 | 3/2002 |
| JP | 2004-013021 | 1/2004 |
| JP | 2004-220016 | 8/2004 |
| JP | 2004-341072 | 12/2004 |
| JP | 2006-098926 | 4/2006 |
| JP | 2008-134324 | 6/2008 |
| JP | 2009-044066 | 2/2009 |
| JP | 2010-166022 | 7/2010 |
| WO | 99/49358 | 9/1999 |
| WO | 99/94358 | 9/1999 |

OTHER PUBLICATIONS

Japanese Office Action issued Apr. 1, 2014 in corresponding Japanese Patent Application No. 2010263735.

Japanese Office Action issued Mar. 31, 2015 in corresponding Japanese Application No. 2010-263735.

Chinese Office Action issued Oct. 31, 2014 in corresponding Chinese Application No. 201110369274.4.

Japanese Office Action issued Dec. 2, 2014 in corresponding Japanese Application No. 2010-263735.

* cited by examiner

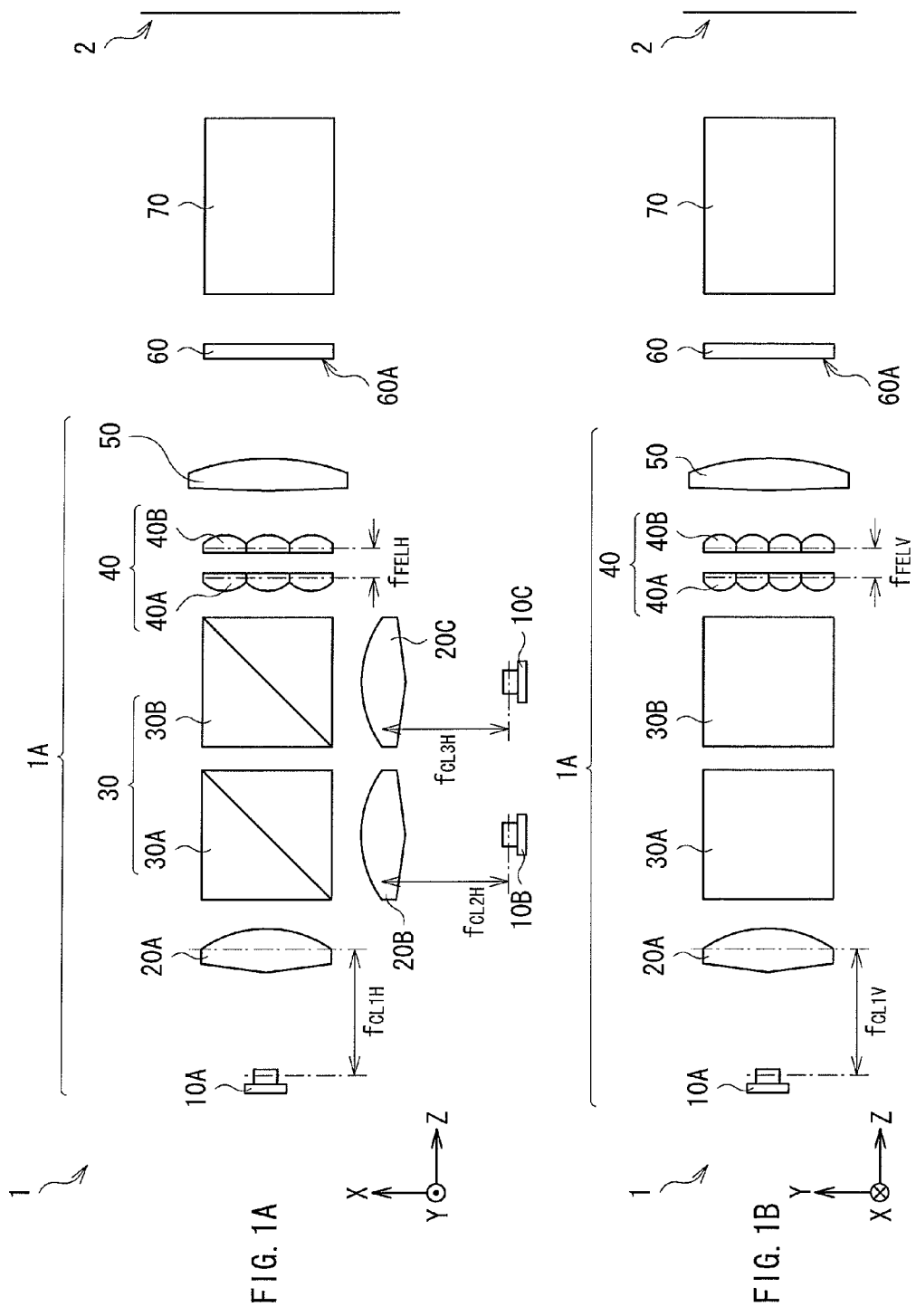

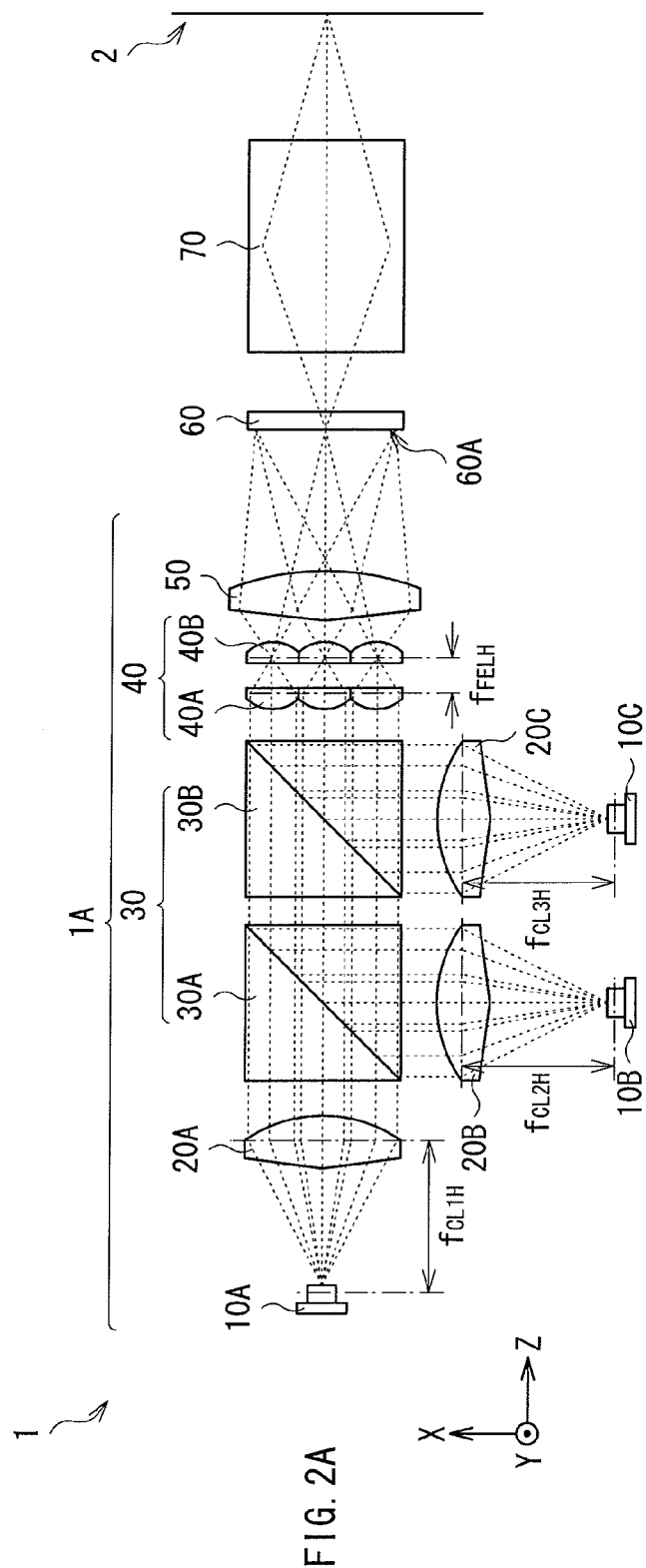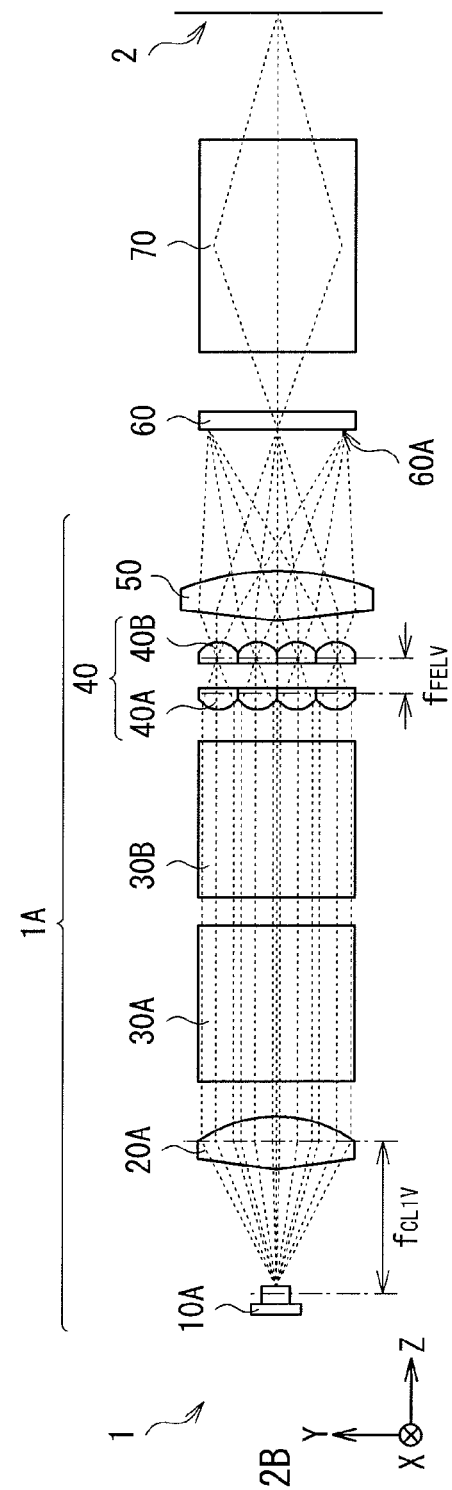
FIG. 2A
FIG. 2B

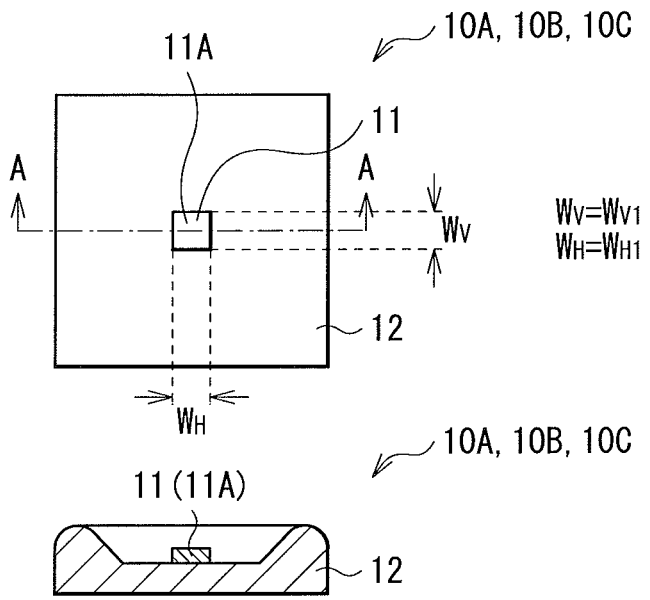
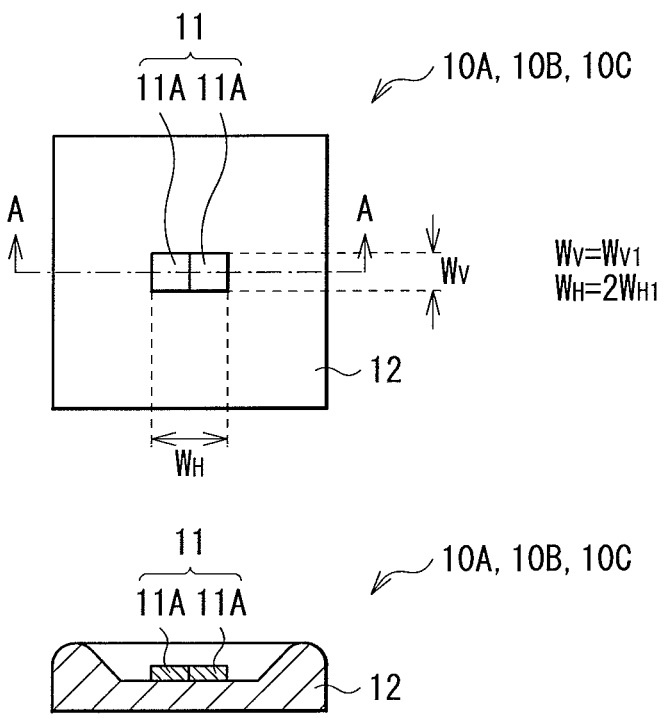

$W_V = W_{V1}$
$W_H \geqq 3W_{H1}$ $W_V \geqq 3W_{V1}$
$W_H = W_{H1}$

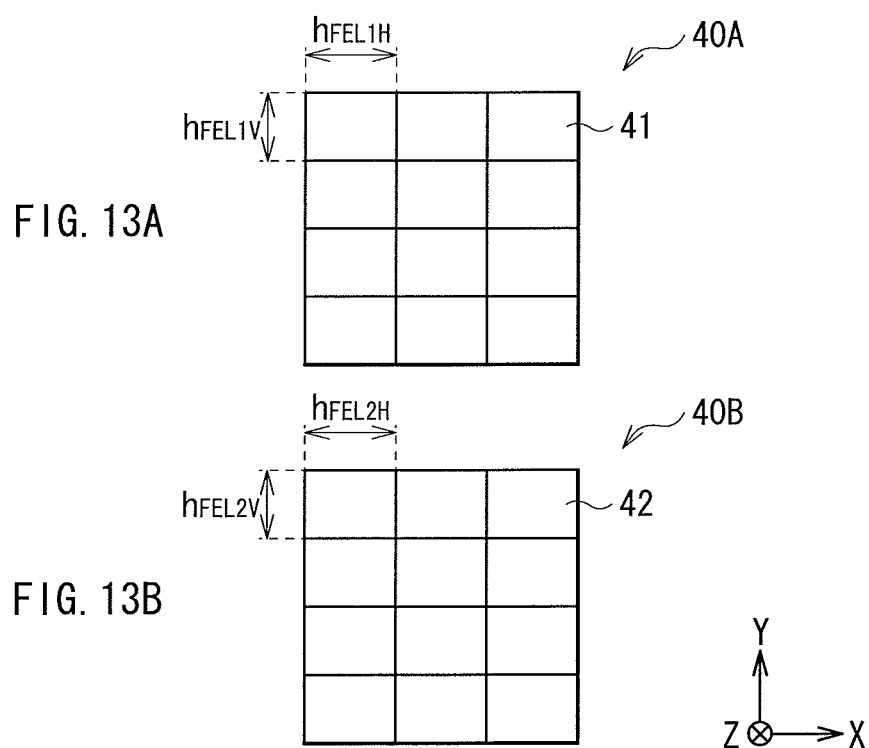

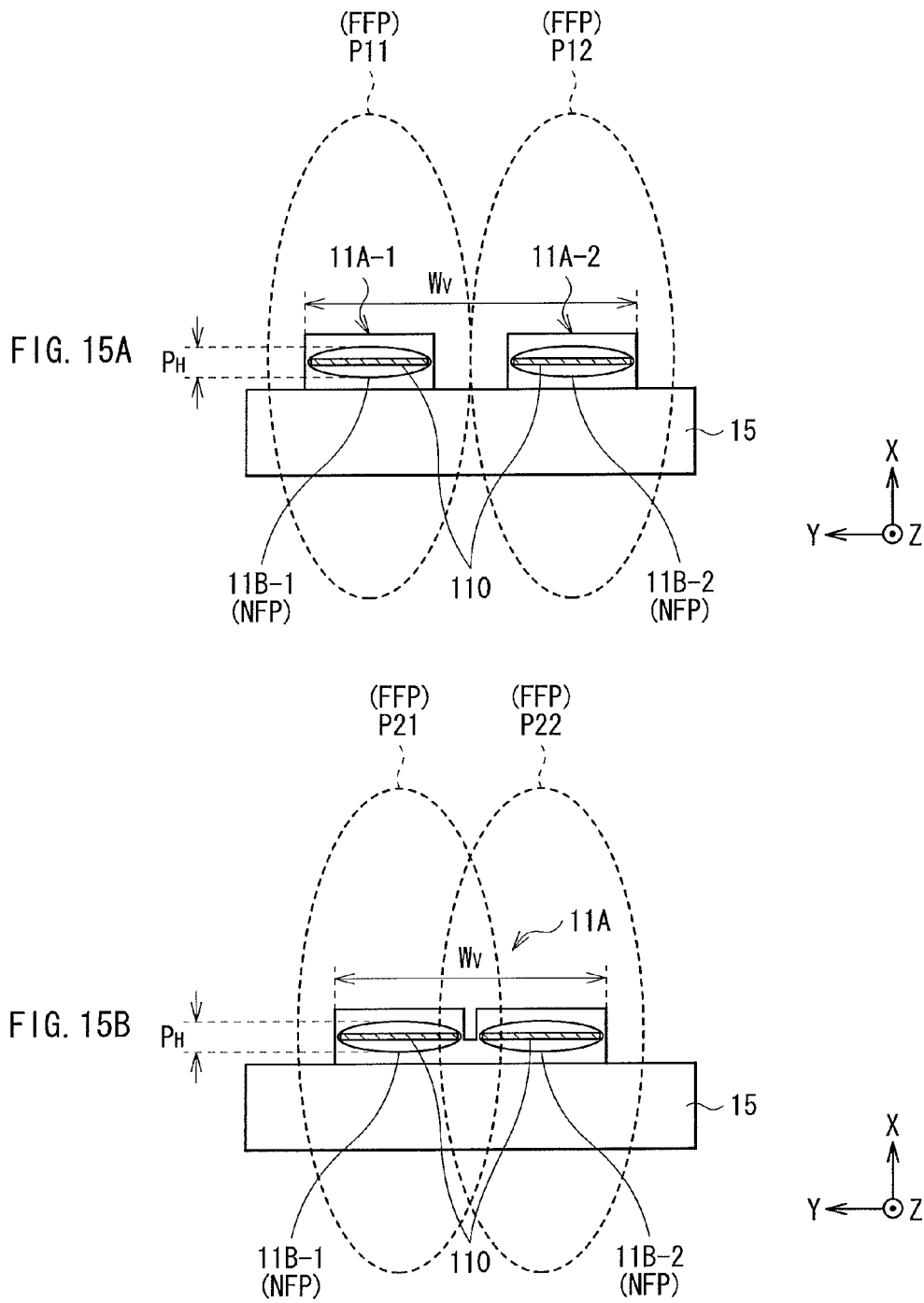

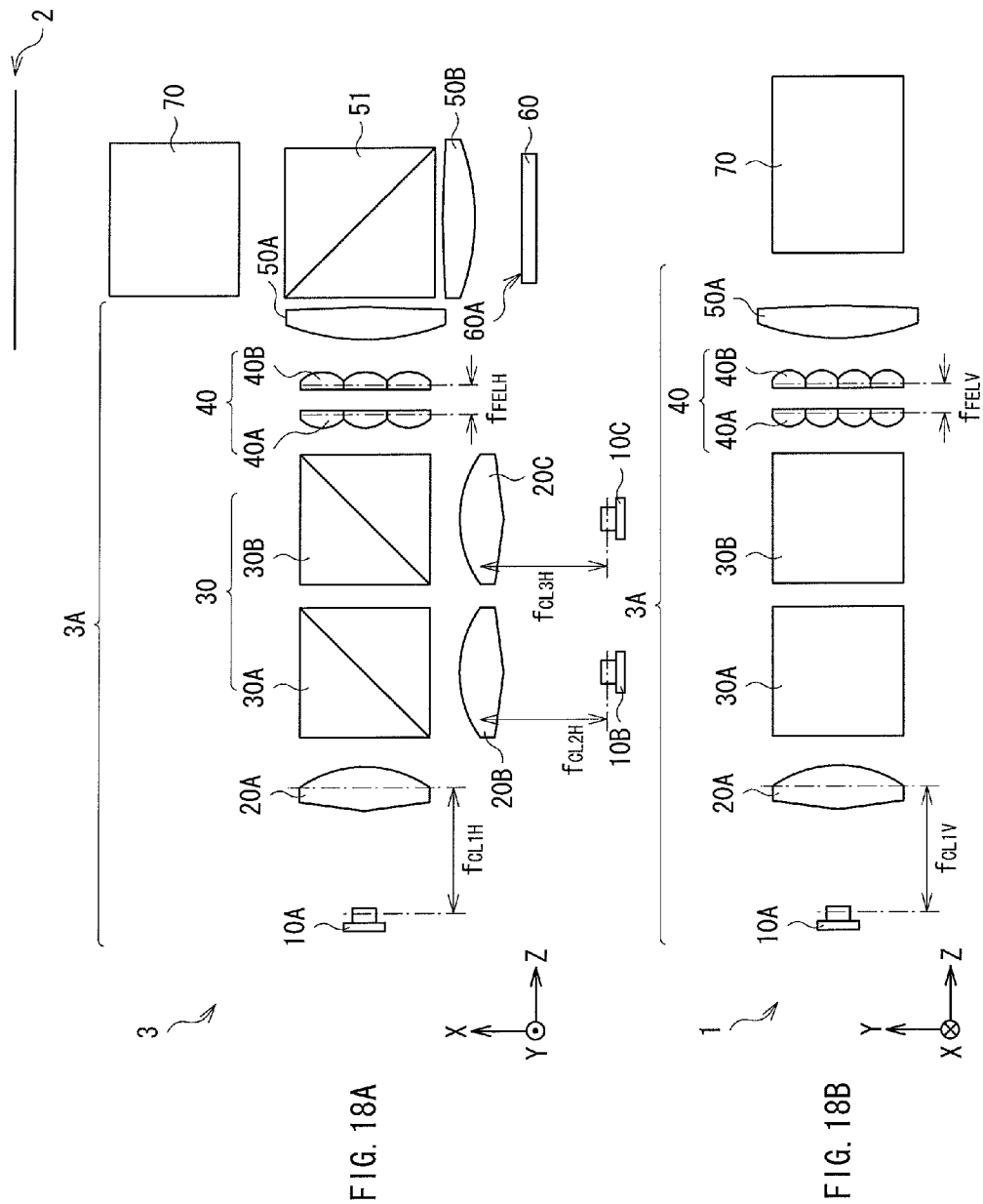

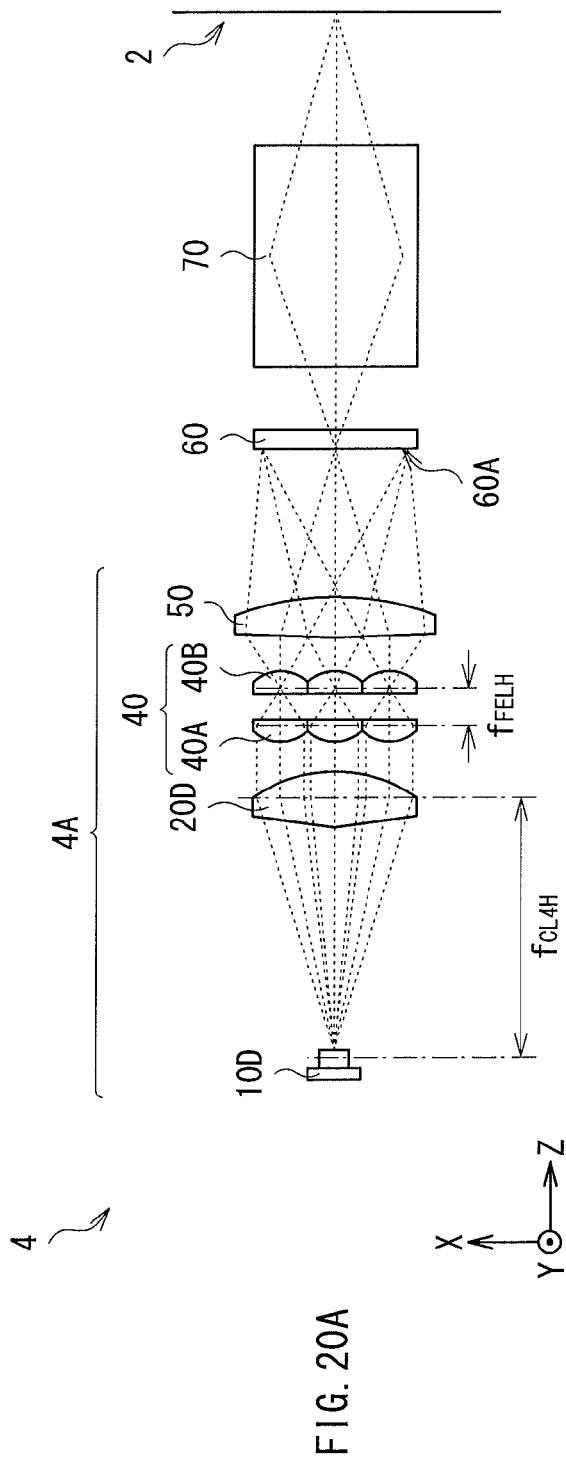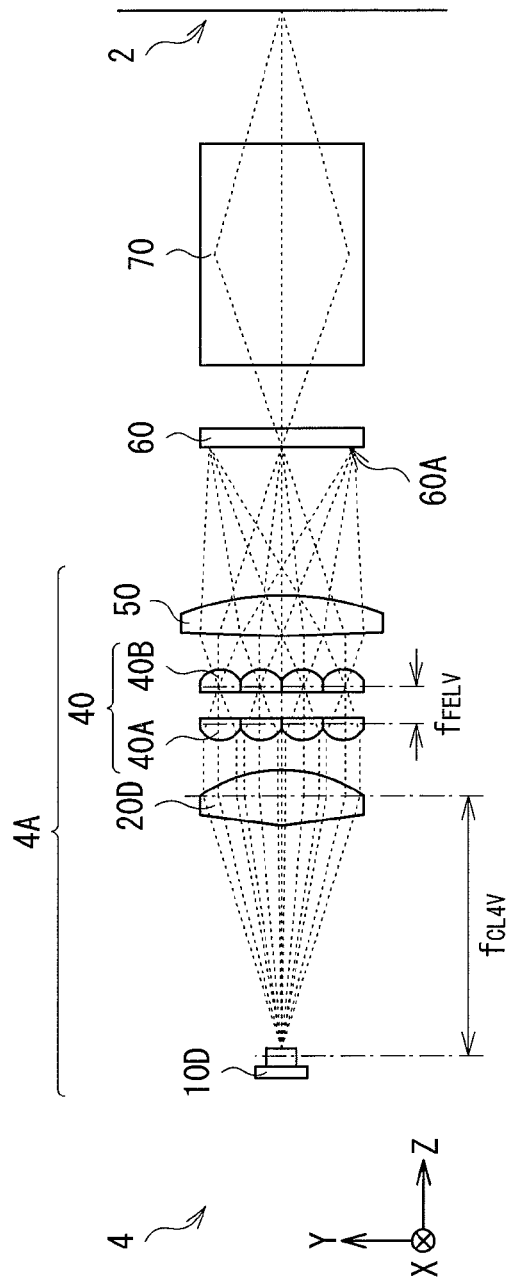
FIG. 20A
FIG. 20B

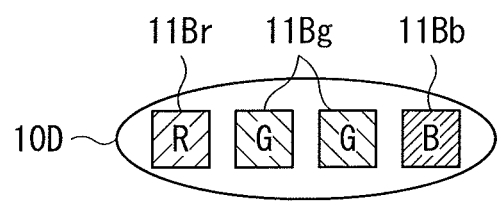
F I G. 21

ILLUMINATION UNIT, PROJECTION DISPLAY UNIT, AND DIRECT VIEW DISPLAY UNIT

CROSS REFERENCES TO RELATED APPLICATIONS

This application is a continuation application of U.S. patent application Ser. No. 13/276,818 filed Oct. 19, 2011, which application claims priority to Japanese Patent Application No. 2010-263735 filed on Nov. 26, 2010, the disclosure of which is incorporated herein by reference.

BACKGROUND

The present disclosure relates to an illumination unit using a solid-state light-emitting device including laser diodes (LDs). In addition, the present disclosure is directed to a projection display unit and a direct view display unit which both are equipped with the illumination unit.

Recently, projectors, which are configured to project images to a screen, are widely used in offices as well as households. A typical projector is designed to generate optical images by modulating light from a light source using a light bulb and to project the optical images to a screen. As a result, the images are displayed on a screen.

Nowadays, tiny or palm-size projectors and portable phones equipped with such a tiny projector are commercially available (for example, refer to Japanese Unexamined patent Application Publication No. 2008-134324).

SUMMARY

Generally, a projector mainly uses a high-intensity discharge lamp as a light source. However, a lamp of this type is relatively large in size and has high power consumption. Therefore, attempts to replace a high-intensity discharge lamp with a solid-state light-emitting device, including light emitting diodes (LEDs), laser diodes (LDs), and organic light emitting devices (OLEDs), are currently attracting interest. Solid-state light-emitting devices are advantageous over high-intensity discharge lamps in terms of compactness, power consumption, and reliability.

Typically, a projector as described above displays color images by using individual light beams of three primary colors, that is, red (R), green (G), and blue (B) light beams. There may be a case, however, that intensities or luminance properties may be different for the respective colors among devices (or chips in a solid-state light-emitting device) which emit the light beams of the three primary colors, respectively. In this case, it is difficult to increase the luminance of illumination light as a whole output from the illumination system.

For example, consider a projector in which a light beam of one color (G) among three primary colors has a lower intensity than the others (R and B light beams) have. In this case, when the white balance of the light as a whole is adjusted, the light beam of the lower intensity (G light beam) needs to be used as a reference, and the other light beams (R and B light beams) are required to be adjusted or adapted thereto. Accordingly, a technique to increase the luminance of light as a whole output from a projector has been in demand.

It is desirable to provide an illumination unit which makes it possible to increase luminance of illumination light. Also, it is desirable to provide a projection display unit and a direct view display unit which both are equipped with the illumination unit.

An illumination unit according to an embodiment of the technology includes: one or more light sources each including a solid-state light-emitting device configured to emit light from a light emission region including a single or a plurality of light-emitting spots, the solid-state light-emitting device including a single chip or a plurality of chips each emitting a light beam, wherein three or more of the light-emitting spots are provided within the whole of one or more light sources, to allow the whole of one or more light sources to emit light beams in two or more wavelength bands different from one another, and the solid-state light emitting device in a first light source which is at least one of the one or more light sources, has a plurality of light-emitting spots which emit light in the same wavelength band.

A projection display unit according to an embodiment of the technology includes: an illumination optical system; a spatial modulation device modulating light from the illumination optical system based on an input picture signal to generate imaging light; and a projection optical system projecting the imaging light generated by the spatial modulation device, the illumination optical system including one or more light sources each including a solid-state light-emitting device configured to emit light from a light emission region including a single or a plurality of light-emitting spots, the solid-state light-emitting device including a single chip or a plurality of chips each emitting a light beam, wherein three or more of the light-emitting spots are provided within the whole of one or more light sources, to allow the whole of one or more light sources to emit light beams in two or more wavelength bands different from one another, and the solid-state light emitting device in a first light source which is at least one of the one or more light sources, has a plurality of light-emitting spots which emit light in the same wavelength band.

A direct view display unit according to an embodiment of the technology includes: an illumination optical system; a spatial modulation device modulating light from the illumination optical system based on an input picture signal to generate imaging light; a projection optical system projecting the imaging light generated by the spatial modulation device; and a transmissive screen displaying the imaging light projected from the projection optical system, the illumination optical system including one or more light sources each including a solid-state light-emitting device configured to emit light from a light emission region including a single or a plurality of light-emitting spots, the solid-state light-emitting device including a single chip or a plurality of chips each emitting a light beam, wherein three or more of the light-emitting spots are provided within the whole of one or more light sources, to allow the whole of one or more light sources to emit light beams in two or more wavelength bands different from one another, and the solid-state light emitting device in a first light source which is at least one of the one or more light sources, has a plurality of light-emitting spots which emit light in the same wavelength band.

In the illumination unit, the projection display unit, and the direct view display unit according to the embodiments of the technology, the three or more of the light-emitting spots are provided within the whole of one or more light sources, to allow the whole of one or more light sources to emit the light beams in the two or more wavelength bands different from one another, and the solid-state light emitting device in at least one of the one or more light sources (for example, the first light source), has the plurality of light-emitting spots which emit the light in the same wavelength band. Thus, it is possible to adjust relative light emission intensities between the light of the respective wavelength bands when the illumination unit emits the light beams in two or more wavelength bands as illumination light.

Advantageously, the illumination unit, the projection display unit, and the direct view display unit each further include one or more traveling-direction angle conversion device each converting a traveling-direction-angle of the light entering from the solid-state light-emitting device; and an integrator uniformalizing illumination distribution in a predetermined illumination region which is to be illuminated by light from the traveling-direction angle conversion device. Further advantageously, the integrator includes a first fly-eye lens having cells which receive light from the traveling-direction angle conversion device, and a second fly-eye lens having cells which receive light from the first fly-eye lens, and an optical system configured with the traveling-direction angle conversion device and the first and second fly-eye lenses has an optical magnification which allows each of light source images to have a size not exceeding a size of the cell in the second fly-eye lens, the light source images being formed on the second fly-eye lens by the respective cells in the first fly-eye lens. In this embodiment, the light incident on the second fly-eye lens reaches the illumination region efficiently. Thus, it is unlikely that one light source image is formed across a plurality of cells, making it possible to improve light use efficiency of the illumination unit.

According to the illumination unit, the projection display unit, and the direct view display unit of the embodiments of the technology, the three or more of the light-emitting spots are provided within the whole of one or more light sources, to allow the whole of one or more light sources to emit the light beams in the two or more wavelength bands different from one another, and the solid-state light emitting device in the first light source which is at least one of the one or more light sources, has the plurality of light-emitting spots which emit the light in the same wavelength band. This makes it possible to adjust relative light emission intensities between the light of the respective wavelength bands when the illumination unit emits the light beams in two or more wavelength bands as illumination light, and to increase the luminance of the illumination light. Furthermore, the plurality of light-emitting spots which emit the light in the same wavelength band are provided in at least one of the one or more light sources (for example, the first light source). This makes it possible to eliminate any optical unification or unifying members for unifying the light beams emitted from those light-emitting spots. It is thus possible to achieve compactness of the units, or to prevent the units from being enlarged as well.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

FIG. 1A shows a schematic structure of a projector according to a first embodiment of the technology as seen from the above.

FIG. 1B shows the schematic structure of the projector as seen from one side.

FIG. 2A shows exemplary optical paths in the projector of FIGS. 1A and 1B as seen from the above.

FIG. 2B shows the optical paths in the projector of FIGS. 1A and 1B as seen from the side.

FIG. 3A shows a top view of an exemplary structure of the light source, when a light source in the projector of FIGS. 1A and 1B has a chip of an upper surface emitting type.

FIG. 3B shows a cross-section of the structure of the light source, taken along the line A-A of FIG. 3A.

FIG. 4A shows a top view of another exemplary structure of the light source, when a light source in the projector of FIGS. 1A and 1B has a chip of an upper surface emitting type.

FIG. 4B shows a cross-section of the structure of the light source, taken along the line A-A of FIG. 4A.

FIG. 13A shows a schematic structure of a pre-fly-eye lens.

FIG. 13B shows a schematic structure of a post-fly-eye lens.

FIG. 15A shows an exemplary relationship of an arrangement and FFPs of light-emitting spots formed on a light source in the projector of FIGS. 1A and 1B.

FIG. 15B shows another exemplary relationship of an arrangement and FFPS of light-emitting spots formed on a light source in the projector of FIGS. 1A and 1B.

FIG. 18A shows a schematic structure of a projector according to a second embodiment of the technology as seen from the above.

FIG. 18B shows the schematic structure of the projector as seen from one side.

FIG. 20A shows exemplary optical paths in the projector of FIGS. 19A and 19B as seen from the above.

FIG. 20B shows the optical paths in the projector of FIGS. 19A and 19B as seen from the side.

FIG. 21 schematically shows an exemplary arrangement of light-emitting spots formed on a light source in the projector of FIGS. 1A and 1B.

DETAILED DESCRIPTION

Figure 5A:
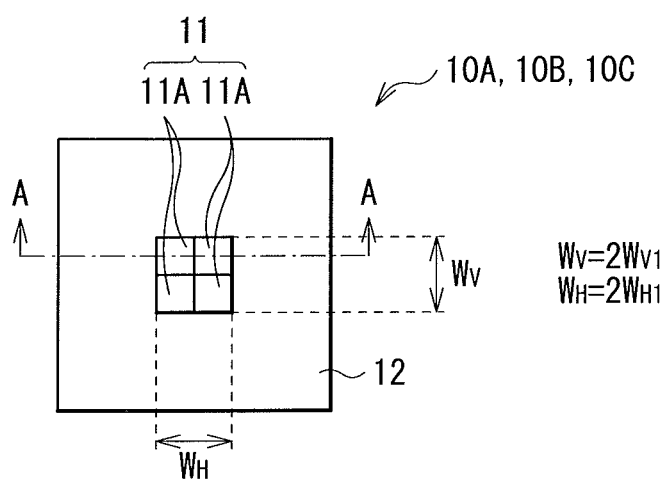
FIG. 5A shows a top view of still another exemplary structure of the light source, when a light source in the projector of FIGS. 1A and 1B has a chip of an upper surface emitting type.

Embodiments of the present application will be described below in detail with reference to the drawings.

1. First embodiment (an example of using three light sources provided in an illumination optical system)

2. Second embodiment (an example of using a reflective device as a spatial modulation device)

3. Third embodiment (an example of using a single light source provided in an illumination optical system.)

4. Modifications

Modification 1 (another example of using multiple light sources provided in an illumination optical system)

Modification 2 (an example of using chips arranged at angles with respect to a light axis in a light source)

Modification 3 (an example of eliminating an integrator and a condenser lens from an illumination optical system)

Other Modifications (examples of an application to a rear projection display device and the like)

First Embodiment

Whole Structure of Projector 1

FIGS. 1A and 1B show a schematic structure of a projector according to a first embodiment of the technology (called a "projector 1" herein). Note that this projector 1 corresponds to a concrete example of a "projection display unit" according to one embodiment of the technology. FIG. 1A shows the structure of the projector 1 as seen from the above or on a Y axis, and FIG. 1B shows the same as seen from one side or on an X axis. FIGS. 2A and 2B show optical paths in the projector 1 of FIGS. 1A and 1B. FIG. 2A shows the optical paths as seen from the above or on the Y axis, and FIG. 2B shows those optical paths as seen from the side or on an X axis.

Generally, the Y axis extends vertically and the X axis extends horizontally, but this embodiment is not limited to this orientation. Alternatively, the Y axis may extend horizontally and the X axis may extend vertically. For the sake of convenience, an explanation will be given based on the premise that the Y and X axes are vertical and horizontal axes, respectively in the embodiments. Furthermore, a "horizontal direction" indicates a direction on the X axis, and a "vertical direction" indicates a direction on the Y axis.

The projector 1 includes, but not limited to, an illumination optical system 1A, a spatial modulation device 60, and a projection optical system 70. Specifically, the spatial modulation device 60 generates optical images (imaging light) by modulating, based on input picture signals, light beams from the illumination optical system 1A, and the projection optical system 70 projects the optical images from the spatial modulation device 60 to a reflection screen 2. Note that the illumination optical system 1A corresponds to a concrete example of an "illumination unit" according to one embodiment of the technology.

[Configuration of Illumination Optical System 1A]

The illumination optical system 1A has a function of delivering light beams for irradiating an illumination region 60A on the spatial modulation device 60. Note that in this illumination optical system 1A, any optical device may be located within a region in which the light beams travel, as necessary. An example of the optical device is an optical filter for attenuating light other than the visible light of light output from the illumination optical system 1A.

Referring to exemplary FIGS. 1A and 1B, the illumination optical system 1A includes, but not limited to, light sources 10A, 10B, and 10C, coupling lens (or traveling-direction angle conversion devices) 20A, 20B, and 20C, an optical path unifying device 30, an integrator 40, and a condenser lens 50. The optical path unifying device 30 has a function of unifying the respective light beams from the light sources 10A, 10B, and 10C. This optical path unifying device 30 includes, but not limited to, two dichroic mirrors 30A and 30B. The integrator 40 has a function of allowing the illumination distribution of the light on the illumination region 60A to be uniform, and it includes, but not limited to, a pair of fly-eye lenses 40A and 40B.

On the optical axis of the light source 10A, the coupling lens 20A, the optical path unifying device 30, the integrator 40, and the condenser lens 50 are aligned in this order from the location of the light source 10A. The optical axis of the light source 10B is perpendicular to that of the light source 10A, and both axes intersects in the dichroic mirror 30A. On the optical axis of the light source 10B, the coupling lens 20B and the dichroic mirror 30A are aligned in this order from the location of the light source 10B. The optical axis of the light source 10C is also perpendicular to that of the light source 10A, and both axes intersect in the dichroic mirror 30B. On the optical axis of the light source 10C, the coupling lens 20C and the dichroic mirror 30B are aligned in this order from the location of the light source 10C.

Note that the combination of the coupling lens (or traveling-direction angle conversion devices) 20A, 20B, and 20C and the integrator 40 correspond to a concrete example of an optical member according to one embodiment of the technology. This optical member has a function of receiving light beams from solid-state light-emitting devices (described later) and allowing the light beams to pass through.

In FIGS. 1A and 1B, among all the components which constitute the projector 1, the components other than the light sources 10B and 10C and the coupling lenses 20B and 20C are aligned with a line parallel to the Z axis. However, this embodiment is not limited to this alignment. Alternatively, these components (or a part thereof) may be arranged in a line which is not parallel to the Z axis. For example, although not shown, the layout of all the components in the illumination optical system 1A may be rotated 90 degrees with respect to that of FIGS. 1A and 1B, so that the optical axis of the illumination optical system 1A is perpendicular to the Z axis. In this case, an additional optical device such as a mirror is necessary in order to lead the light beams from the illumination optical system 1A to the spatial modulation device 60. Moreover, the layout of the light source 10A, the coupling lens 20A, and the optical path unifying device 30 may be angled 90 degrees with respect to that of FIGS. 1A and 1B, so that their optical axis is perpendicular to the Z axis. Even in this case, an additional optical device such as a mirror is also necessary in order to lead the light beams from the optical path unifying device 30 to the integrator 40.

[Structure where Light Sources 10A, 10B, and 10C have Chips 11A of Upper Surface Emitting Type]

Figure 5B:
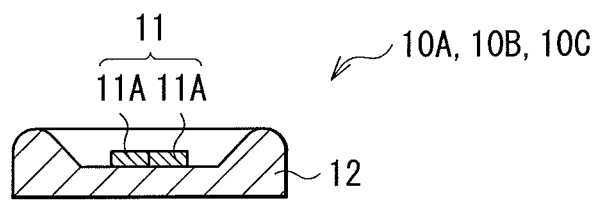
FIG. 5B shows a cross-section of the structure of the light source, taken along the line A-A of FIG. 5A.

Referring to exemplary FIGS. 3A and 3B to 5A and 5B, each of the light sources 10A, 10B, and 10C includes, but not limited to, a solid-state light-emitting device 11, and a package 12 in which the solid-state light-emitting device 11 is supported on a substrate material. In other words, each of the light sources 10A, 10B, and 10C may be implemented by a package in which the solid-state light-emitting device 11 is supported on a substrate material. The solid-state light-emitting device 11 has a function of emitting light beams from a light emission region, and this light emission region has one or more light-emitting spots of a dot or non-dot shape. The solid-state light-emitting device 11 may be composed of the single chip 11A which emits a light beam of a predetermined wavelength (wavelength band), as shown in exemplary FIGS. 3A and 3B. Alternatively, the device 11 may be composed of the multiple chips 11A which emit light beams of the same wavelength or different wavelengths, as shown in exemplary FIGS. 4A, 4B, 5A and 5B. In the latter case, the chips 11A may be arranged laterally in a line as shown in FIGS. 4A and 4B or may be arranged in a matrix form as shown in FIGS. 5A and 5B. Moreover, the light sources 10A, 10B, and 10C may have a different number of chips 11 or the same number of chips 11 in the respective solid-state light-emitting devices 11.

If the solid-state light-emitting device 11 is composed of the single chip 11A, then the size ($W_V \times W_H$) of the device 11 may be the same as the size ($W_{V1} \times W_{H1}$) of the single chip 11A, as shown in FIG. 3A. Meanwhile, if the solid-state light-emitting device 11 is composed of the multiple chips 11A, then the size of the device 11 may be the same as that of an area defined by arranging all the chips 11A adjacent to one another, as shown in FIGS. 4A and 5A.

When the multiple chips 11A are arranged laterally in a line as shown in exemplary FIG. 4A, the size ($W_V \times W_H$) of the device 11 is equal to the size ($W_{V1} \times 2W_{H1}$). Meanwhile, when the multiple chips 11A are arranged in a matrix form as shown in FIG. 5A, the size ($W_V \times W_H$) of the device 11 is equal to the size ($2W_{V1} \times 2W_{H1}$).

The chip 11A may be any of a light-emitting diode (LED), an organic light-emitting device (OLED), and a laser diode (LD). All the chips 11A in the light sources 10A, 10B, and 10C may be any of LEDs, OLEDs or LDs. Alternatively, the chip 11A in at least one of the light sources 10A, 10B, and 10C may be an LED, and the chips 11A in the others may be OLEDs. Furthermore, the chip 11A in at least one of the light sources 10A, 10B, and 10C may be an LED, and the chips 11A in the others may be LDs. Moreover, the chip 11A in at least one of the light sources 10A, 10B, and 10C may be an OLED, and the chips 11A in the others may be LDs. However, it is preferable that all the chips 11A in the light sources 10A, 10B, and 10C include at least one LD.

The respective chips 11A in the light sources 10A, 10B, and 10C may be designed to emit light beams of different wavelengths. To give an example, the chip 11A of the light source 10A emits a light beam having a wavelength of about 400 nm to 500 nm or a blue light beam. The chip 11A of the light source 10B emits a light beam having a wavelength of about 500 nm to 600 nm or a green light beam. The chip 11A of the light source 10C emits a light beam having a wavelength of about 600 nm to 700 nm or a red light beam.

To give another example, the chip 11A of the light source 10A emits a light beam other than a blue light beam, that is, a green or red light beam. The chip 11A of the light source 10B emits a light beam other than a green light beam, that is, a blue or red light beam. The chip 11A of the light source 10C emits a light beam other than a red light beam, that is, a green or blue light beam. Concrete examples will be given later of colors of light beams from the chips 11A in the light sources 10A, 10B, and 10C with reference to exemplary FIGS. 14A to 14C.

Referring to FIGS. 3A and 3B to 6A, 6B, and 6C, each chip 11A has a light-emitting spot 11B, of which size ($P_{V1} \times P_{H1}$) is smaller than the size ($W_V \times W_H$) of the chip 11A itself. This light-emitting spot 11B corresponds to a light emission region, that is, a region from which a light beam is emitted while the chip 11A is driven by supplying a current thereto.

When the chip 11A is an LED or OLED, the light-emitting spot 11B thereon has a non-dot shape, that is, a square or rectangular shape. Meanwhile, when the chip 11A is an LD, the light-emitting spot 11B thereon has a dot shape, and this spot is smaller than the light-emitting spot 11B when the chip 11A is an LED or OLED.

Figure 6A:
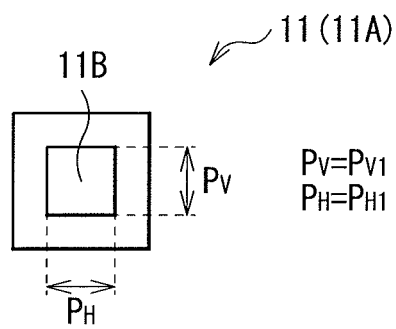
FIG. 6A shows a top view of an exemplary arrangement of a light-emitting spot on the light source, when a chip in a light source in the projector of FIGS. 1A and 1B has an upper surface emitting type.

If the solid-state light-emitting device 11 is composed of the single chip 11A, then the number of light-emitting spots 11B formed thereon is one, as shown in exemplary FIG. 6A. Exceptionally, if the device 11 has a monolithic structure, then the number of spots 11B is plural, as described in detail later.

Figure 6B:
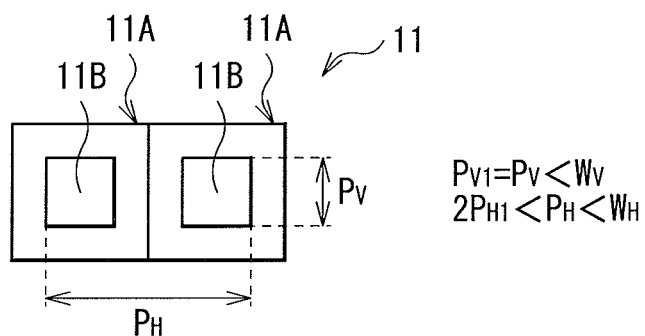
FIG. 6B shows a top view of another exemplary arrangement of a light-emitting spot on the light source, when a chip in a light source in the projector of FIGS. 1A and 1B has an upper surface emitting type.
Figure 6C:
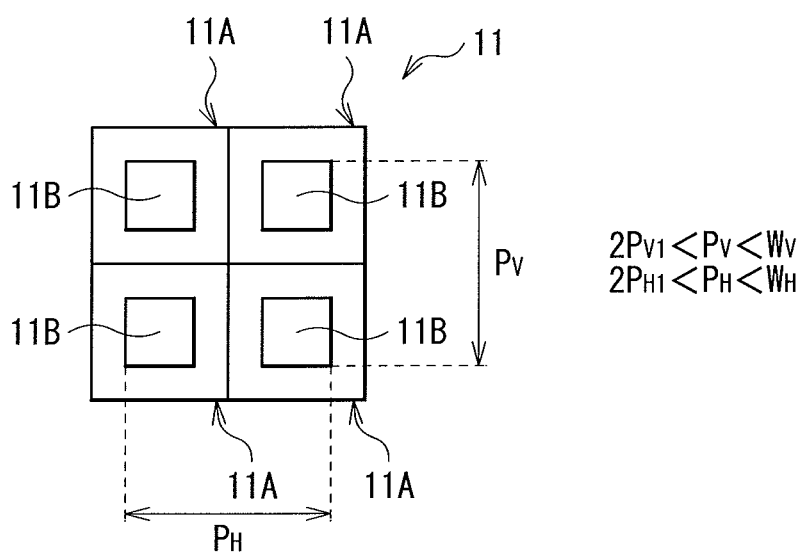
FIG. 6C shows a top view of still another exemplary arrangement of a light-emitting spot on the light source, when a chip in a light source in the projector of FIGS. 1A and 1B has an upper surface emitting type.
Figure 7A:
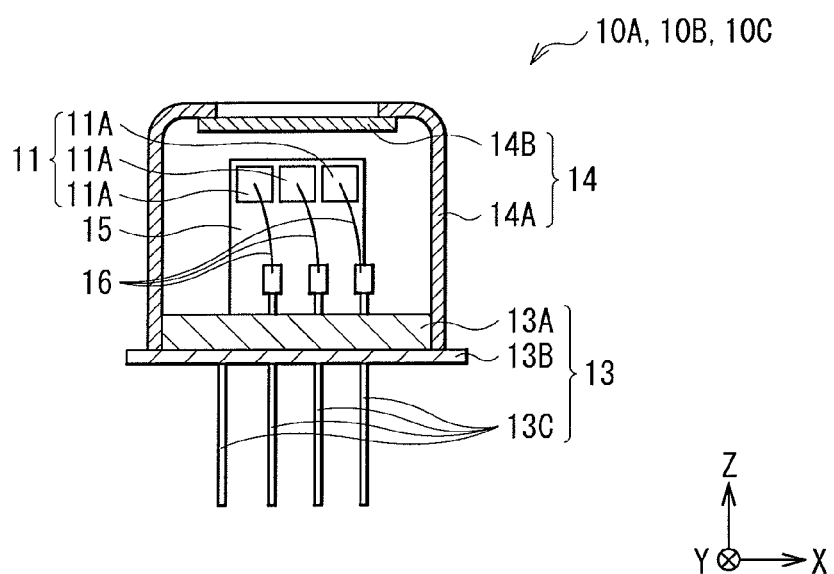
FIG. 7A shows a cross section of an exemplary structure of a light source in the projector of FIGS. 1A and 1B, when chips in the light source are of a side surface emitting type.
Figure 7B:
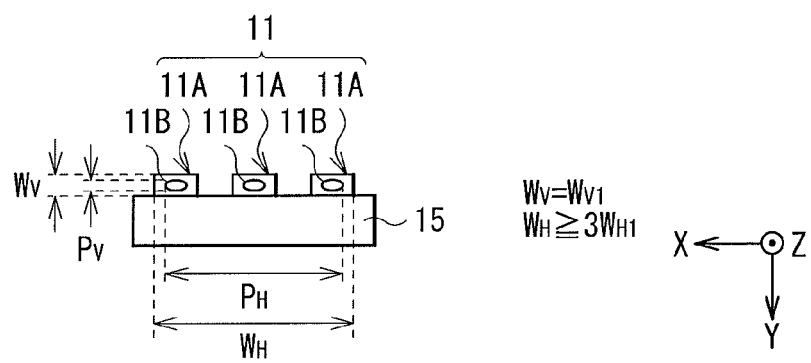
FIG. 7B shows a solid-state light-emitting device in the light source as seen from its light emitting surface.
Figure 8A:
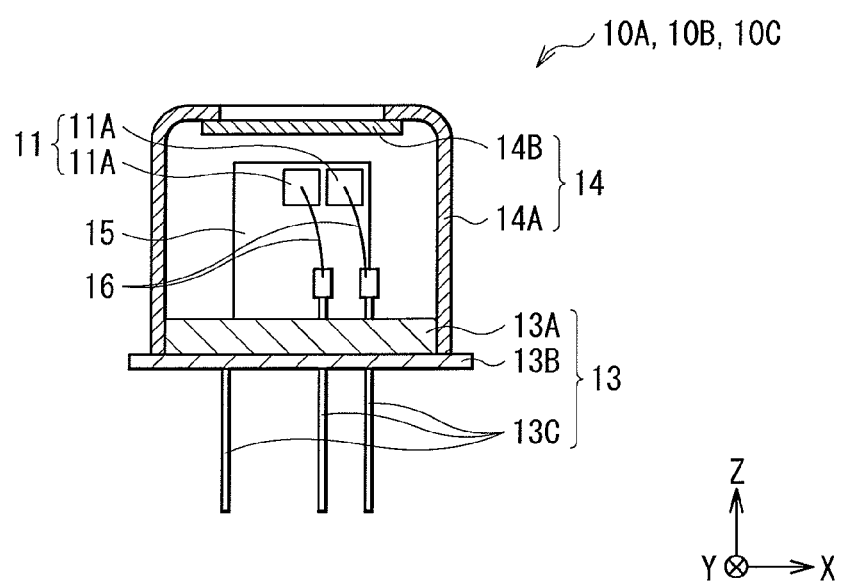
FIG. 8A shows a cross section of another exemplary structure of a light source in the projector of FIGS. 1A and 1B, when chips in the light source are of a side surface emitting type.
Figure 8B:
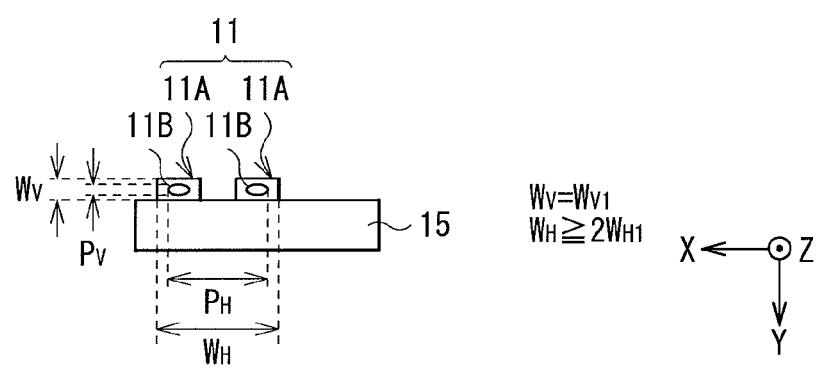
FIG. 8B shows a solid-state light-emitting device in the light source as seen from its light emitting surface.

Meanwhile, if the solid-state light-emitting device 11 is composed of the multiple chips 11A, the light-emitting spot 11B formed thereon are equal in number to the chips 11A, as shown in exemplary FIGS. 6B and 6C. Likewise, if the device 11 has a monolithic structure, then the number of spots 11B is greater than that of the chips 11A.

When the solid-state light-emitting device 11 is composed of the single chip 11A, the size ($P_V \times P_H$) of the light emission region in the device 11 is equal to the size ($P_{V1} \times P_{H1}$) of the light-emitting spot 11B, as shown in FIG. 6A. However, a case where the solid-state light-emitting device 11 has a monolithic structure as described above is made an exception.

Meanwhile, when the solid-state light-emitting device 11 is composed of the multiple chips 11A, the size ($P_V \times P_H$) of the light emission region in the device 11 is equal to the size of the region defined by the outer frame of the light-emitting spots 11B of the chips 11A when all the chips 11A are tiled with a minimum area. When the multiple chips 11A are arranged in a line as shown in FIG. 6B, the size ($P_V \times P_H$) of the light emission region is larger than the size ($P_{V1} \times 2P_{H1}$) and smaller than the size ($W_V \times W_H$). In addition, when the multiple chips 11A are arranged in a matrix shape as shown in FIG. 6C, the size ($P_V \times P_H$) of the light emission region is larger than the size ($2P_{V1} \times 2P_{H1}$) and smaller than the size ($W_V \times W_H$).

[Structure where Light Sources 10A, 10B, and 10C have Chips 11A of Side Surface Emitting Type]

Up to this point, with reference to FIGS. 3A and 3B to 6A and 6B, the description has been given by exemplifying the case where the chips 11A are of an upper surface emitting type. However, the chip 11A may be of a side surface emitting type. Next, a description will be give by exemplifying a case where the chips 11A are of a side surface emitting type.

Referring to exemplary FIGS. 7A and 7B to 12A, 12B, and 12C, each of the light sources 10A, 10B, and 10C has a can type, and includes a stem 13, a cap 14, and the solid-state light-emitting device 11 composed of one or more side surface emitting type chips 11A. In addition, the device 11 is placed within an inner space defined by the stem 13 and the cap 14. In other words, each of the light sources 10A, 10B, and 10C is implemented by a package that houses the solid-state light-emitting device 11.

The stem 13 and the cap 14 constitute the package in which the light sources 10A, 10B, 10C, or 10D (described later) is contained. This stem 13 includes, but not limited to, a support substrate 13A supporting a sub-mount 15, an outer-rim substrate 13B located on the rear surface of the support substrate 13A, and multiple connecting pins 13C.

The sub-mount 15 is made of conductive and heat dissipating material. Each of the support substrate 13A and the outer-rim substrate 13B is fabricated by forming one or more insulating through-holes and one or more conductive through-holes in a conductive and heat dissipating substrate. Each of the support substrate 13A and the outer-rim substrate 13B has, for example, a disc-shape, and both of them are stacked while being concentric with each other. The diameter of the outer-rim substrate 13B is larger than that of the support substrate 13A. The outer-rim substrate 13B is a circular flange provided on a plane perpendicular to a central axis of the substrate 13B, and is formed spreading out in the circumferential directions from the central axis. This circular flange serves as defining the reference position of the cap 14 with respect to the support substrate 13A when the cap 14 is attached to the support substrate 13 during a fabrication process.

The connecting pins 13C pass through the support substrate 13A and the like. All the connecting pins 13C except at least one connecting pin, which are called "connecting pins α" for convenience' sake, are electrically connected to the corresponding electrodes (not shown) on the chips 11A, respectively. For example, the connecting pins α extend both from the outer-rim substrate 13B and from the support substrate 13A. In addition, the portion of each connecting pin α which protrudes from the support substrate 13A may be longer than that protruding from the outer-rim substrate 13B.

Meanwhile, the connecting pin 13C except the connecting pin α, which is called a "connecting pin β" for convenience' sake, is electrically connected to the other electrodes (not shown) on the chips 11A. For example, one end of the connecting pin β may protrude from the outer-rim substrate 13B lengthwise, and the other end is embedded in the support substrate 13A. The end of the connecting pin 13C which protrudes far from the outer-rim substrate 13B is to be inserted into, for example, a circuit board (not shown). The ends of the connecting pins 13C which protrude a little from the support substrate 13A are connected to the chips 11A through wires 16, respectively. Meanwhile, the other ends of the connecting pin 13C which are embedded in the support substrate 13A are electrically connected to all the chips 11A through the support substrate 13A and the sub-mount 15. The connecting pins α are supported by the insulating through holes formed in the support substrate 13A and the outer-rim substrate 13B. These through-holes make the connecting pins α be insulated from both the support substrate 13A and the outer-rim substrate 13B. Also, the through-holes make the connecting pins α be insulated from one another. Meanwhile, the connecting pins β are supported by through-holes formed in both the support substrate 13A and the outer-rim substrate 13B, and the pins β are electrically connected to these through-holes.

The cap 14 has a function of sealing the solid-state light-emitting device 11. This cap 14 includes, but not limited to, a cylinder portion 14A provided with openings at the upper and lower edges. For example, the lower edge of the cylinder portion 14A is in contact with the side of the support substrate 13A, thereby defining an inner space in which the solid-state light-emitting device 11 is placed. The cap 14 further includes a light-emitting window 14B adapted to cover the upper opening of the cylinder portion 14A. The light-emitting window 14B is placed facing the light emission region of solid-state light-emitting device 11, and allows the light beams from the solid-state light-emitting device 11 to pass through.

Even if the chip 11A is of the side surface emitting type, the solid-state light-emitting device 11 also emits light beams from the light emission region composed of one or more light-emitting spots of a dot or non-dot shape. The solid-state light-emitting device 11 may be composed of the single chip 11A for emitting a light beam of a predetermined wavelength. Alternatively, the device 11 may be composed of the multiple chips 11A for emitting light beams of the same wavelength or different wavelengths. In the latter case, the chips 11A may be arranged in a line laterally as shown in FIGS. 7A, 7B, 8A, and 8B, or longitudinally as shown in FIGS. 10A, 10B, 11A, and 11B. In addition, the individual solid-state light-emitting devices 11 in the light sources 10A, 10B, and 10C may have a different number of chips 11A or the same number of chips 11A.

Figure 9A:
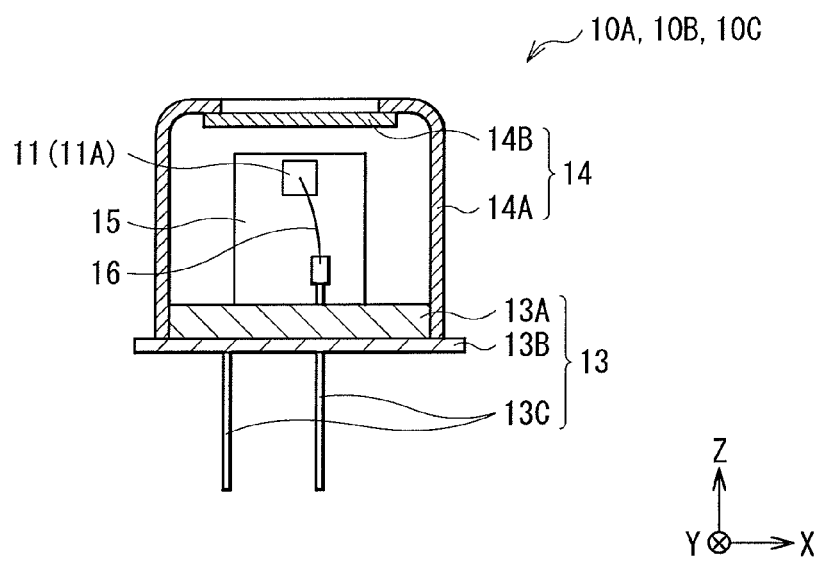
FIG. 9A shows a cross section of further another exemplary structure of a light source in the projector of FIGS. 1A and 1B, when chips in the light source are of a side surface emitting type.
Figure 9B:
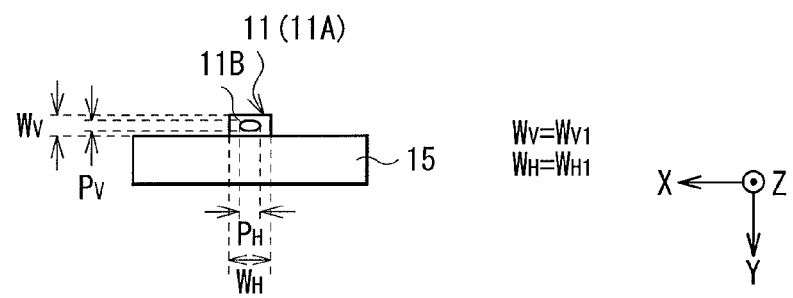
FIG. 9B shows a solid-state light-emitting device in the light source as seen from its light emitting surface.
Figure 9C:
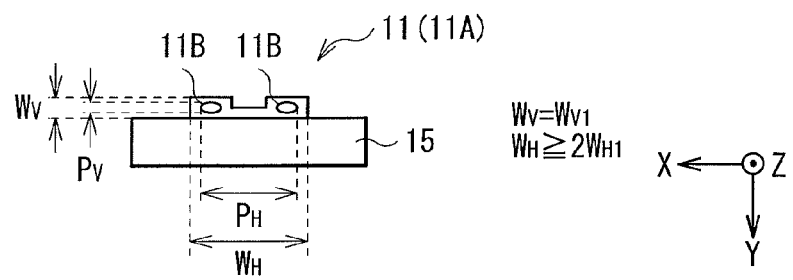
FIG. 9C shows a solid-state light-emitting device of a monolithic structure in the light source as seen from its light emitting surface.
Figure 10A:
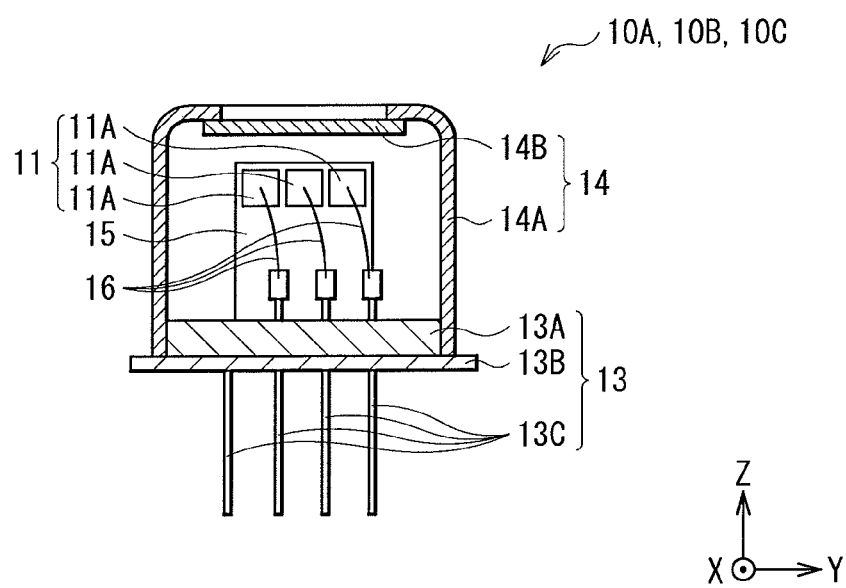
FIG. 10A shows a cross section of the structure of the light source of FIG. 7A, when it is angled 90 degrees on the XY plane.
Figure 10B:
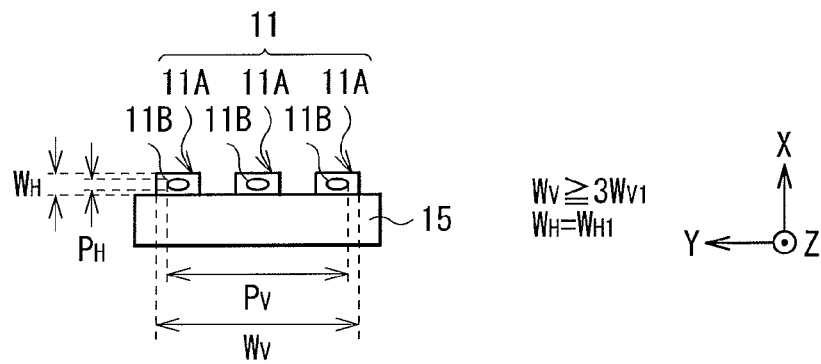
FIG. 10B shows the solid-state light-emitting device in the light source as seen from its light emitting surface.
Figure 11A:
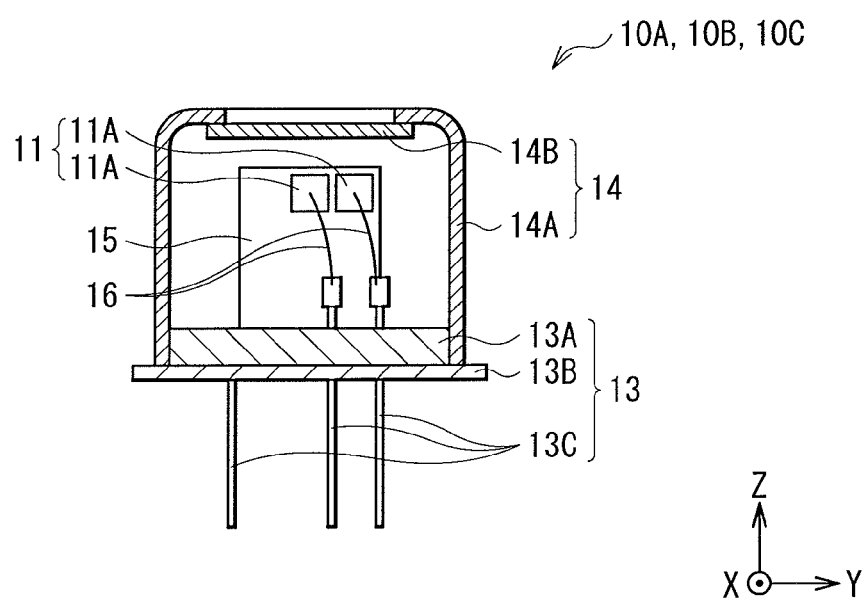
FIG. 11A shows a cross section of the structure of the light source of FIG. 8A, when it is angled 90 degrees on the XY plane.
Figure 11B:
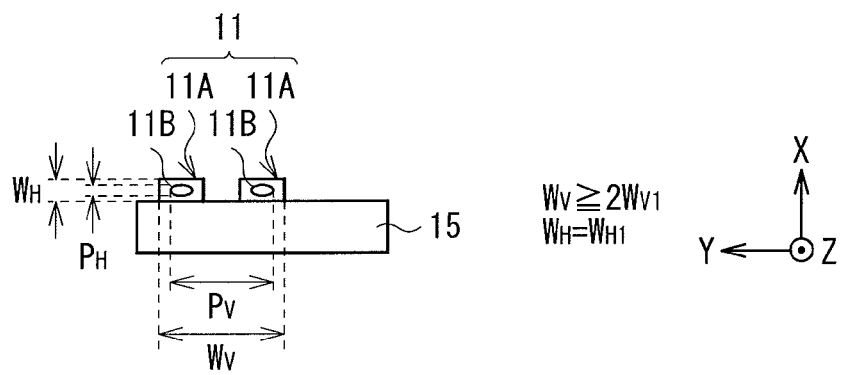
FIG. 11B shows the solid-state light-emitting device in the light source as seen from its light emitting surface.
Figure 12A:
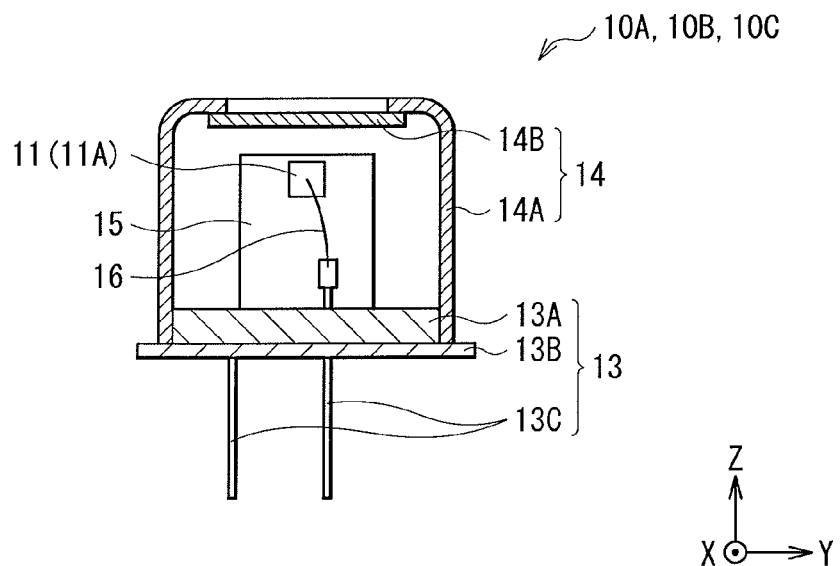
FIG. 12A shows a cross section of the structure of the light source of FIGS. 9A to 9C, when it is angled 90 degrees on the XY plane.
Figure 12B:
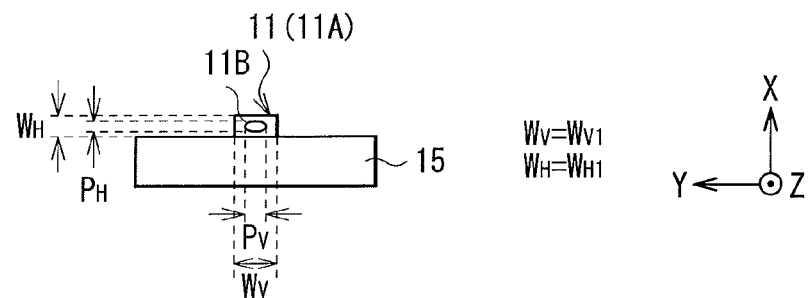
FIG. 12B shows the solid-state light-emitting device in the light source as seen from its light emitting surface.
Figure 12C:
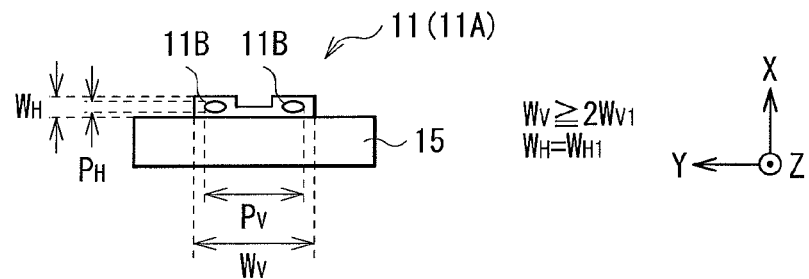
FIG. 12C shows a solid-state light-emitting device of a monolithic structure in the light source as seen from its light emitting surface.

If the solid-state light-emitting device 11 is composed of the single chip 11A, then the size ($W_V \times W_H$) of the device 11 is equal to the size ($W_{V1} \times W_{H1}$) of the single chip 11A, as shown in exemplary FIGS. 9B and 12B. Exceptionally, if the device 11 has a monolithic structure as shown in exemplary FIGS. 9C and 12C, the size ($W_V \times W_H$) of the device 11 is as follows. Specifically, the size ($W_V \times W_H$) of the device 11 is larger than the size ($W_{V1} \times 2W_{H1}$) in the case shown in FIG. 9C, or the size ($2W_{V1} \times 2W_{H1}$) in the case shown in FIG. 12C.

Meanwhile, if the solid-state light-emitting device 11 is composed of the multiple chips 11A, the size of the device 11 is equal to the size of an area defined by tiling all the chips 11A, as shown in exemplary FIGS. 7B, 8B, 10B, and 11B. When the chips 11A are arranged laterally in a line, the size ($W_V \times W_H$) of the device 11 is larger than the size ($W_{V1} \times 3W_{H1}$) in the case shown in FIG. 7B, or the size ($W_{V1} \times 2W_{H1}$) in the case shown in FIG. 8B. In addition, when the chips 11A are arranged longitudinally in a line, the size ($W_V \times W_H$) of the device 11 is larger than the size ($3W_{V1} \times W_{H1}$) in the case shown in FIG. 10B, or the size ($2W_{V1} \times W_{H1}$) in the case shown in FIG. 11B.

The chip 11A may be a laser diode (LD), and all the chips 11A in the light sources 10A, 10B, and 10C may be LDs. Alternatively, the chip 11A in at least one of the light sources 10A, 10B, and 10C may be an LD, and the chips 11A in the other sources may be LEDs or OLEDs. Even in this case, it is preferable that the chips 11A in the light sources 10A, 10B, and 10C include at least one LD.

Each chip 11A has a light-emitting spot 11B, of which size ($P_{V1} \times P_{H1}$) is smaller than the size ($W_V \times W_H$) of the chip 11A itself, as shown in exemplary FIGS. 7A and 7B to 15A, 15B, and 15C. This light-emitting spot 11B corresponds to a light emission region, that is, a region from which a light beam is emitted while the chip 11A is driven by supplying a current thereto. If the chip 11A is an LD, then the light-emitting spot 11B of the chip 11 has a dot-shape and is smaller than that of an LED or OLED.

If the solid-state light-emitting device 11 is composed of the single chip 11A, then the number of light-emitting spots 11B formed thereon is one, as shown in exemplary FIGS. 9B and 12B. Exceptionally, if the solid-state light-emitting device 11 has a monolithic structure, then the number of light-emitting spots 11B is plural (two in the figures), as shown in exemplary FIGS. 9C and 12C. Meanwhile, if the solid-state light-emitting device 11 is composed of the multiple chips 11A, the number of light-emitting spots 11B formed thereon is equal to that of the chips 11A, as shown in exemplary FIGS. 7B, 8B, 10B, and 11B.

When the solid-state light-emitting device 11 is composed of the single chip 11A, the size ($P_V \times P_H$) of the light emission region in the device 11 is equal to the size ($P_{V1} \times P_{H1}$) of the light-emitting spot 11B. Exceptionally, when the solid-state light-emitting device 11 has a monolithic structure as shown in exemplary FIGS. 9C and 12C, the size ($P_V \times P_H$) of the light emission region in the device 11 is as follows. Specifically, the size ($P_V \times P_H$) of the light emission region in the device 11 is larger than the size ($P_{V1} \times 2P_{H1}$) and smaller than the size ($W_V \times W_H$) in the case shown in FIG. 9C. In addition, the size ($P_V \times P_H$) of the light emission region in the device 11 is larger than the size ($2P_{V1} \times P_{H1}$) and smaller than the size ($W_V \times W_H$) in the case shown in FIG. 12C.

Meanwhile, when the solid-state light-emitting device 11 are composed of the multiple chips 11A, the size ($P_V \times P_H$) of the light emission region in the device 11 is equal to the size of the region defined by the outer frame of the light-emitting spots 11B of the chips 11 when all the chips 11A are tiled with a minimum area. When the chips 11A are arranged laterally in a line, the size ($P_V \times P_H$) of the light emission region is larger than the size ($P_{V1} \times 3P_{H1}$) and smaller than the size ($W_V \times W_H$) in the case shown in FIG. 7B. Likewise, the size ($P_V \times P_H$) of the light emission region is larger than the size ($P_{V1} \times 2P_{H1}$) and smaller than the size ($W_V \times W_H$) in the case shown in FIG. 8B. Furthermore, when the chips 11A are arranged longitudinally in a line, the size ($P_V \times P_H$) of the light emission region is larger than the size ($3P_{V1} \times P_{H1}$) and smaller than the size of ($W_V \times W_H$) in the case shown in FIG. 10B. Likewise, the size ($P_V \times P_H$) of the light emission region is larger than the size ($2P_{V1} \times P_{H1}$) and smaller than the size of ($W_V \times W_H$) in the case shown in FIG. 11B.

Now, referring to FIGS. 2A and 2B again, an explanation will be given below of functions of the optical components in the projector 1. The coupling lens 20A has a function of converting the light beam from the light source 10A into a substantially collimated light beam. In other words, the coupling lens 20A changes the traveling-direction-angles ($\theta_H$, $\theta_V$) of the light beam from the light source 10A into those of a collimated or substantially collimated light beam. This coupling lens 20A is positioned such that among all the light components in the light beam from the light source 10A, only the light components of which spread angle is less than the traveling-direction-angles ($\theta_H$, $\theta_V$) are incident on the coupling lens 20A.

Also, as shown in FIGS. 2A and 2B, the coupling lens 20B has a function of converting the light beam from the light source 10B into a substantially collimated light beam. In other words, the coupling lens 20B changes the traveling-direction-angles ($\theta_H$, $\theta_V$) of the light beam from the light source 10B into those of a collimated or substantially collimated light beam. This coupling lens 20B is positioned such that among all the light components in the light beam from the light source 10B, only the light components of which spread angle is less than the traveling-direction-angles ($\theta_H$, $\theta_V$) are incident on the coupling lens 20B.

Likewise, as shown in FIGS. 2A and 2B, the coupling lens 20C has a function of converting the light beam from the light source 10C into a substantially collimated light beam. In other words, the coupling lens 20B changes the traveling-direction-angles ($\theta_H$, $\theta_V$) of the light beam from the light source 10C into those of a collimated or substantially collimated light beam. This coupling lens 20C is positioned such that among all the light components in the light beam from the light source 10C, only the light components of which spread angle is less than the traveling-direction-angles ($\theta_H$, $\theta_V$) are incident on the coupling lens 20C.

Thus, the above-described coupling lenses 20A, 20B and 20C are positioned corresponding to the light sources 10A, 10B, and 10C (or their packages), respectively. Note that each of the coupling lenses 20A, 20B and 20C may be implemented by a single lens or a combination of multiple lenses.

Each of the dichroic mirrors 30A and 30B includes a single mirror having a wavelength selective property. This mirror may be formed by depositing multiple-layered interference films on a mirror surface.

In exemplary FIGS. 2A and 2B, once a light beam from the light source A is incident on the rear surface of the mirror in the dichroic mirror 30A, the mirror allows the incident light to pass through and to output it from its front surface. In addition, once a light beam from the light source B is incident on the front surface of the mirror in the dichroic mirror 30A, the mirror reflects the incident light.

Likewise, in exemplary FIGS. 2A and 2B, once the light from the light source A is incident on the rear surface of the mirror in the dichroic mirror 30B, the mirror allows the incident light to pass through and to output it from its front surface. In addition, once light from the light source C is incident on the front surface of the mirror in the dichroic mirror 30B, the mirror reflects the incident light.

In this way, the optical path unifying device 30 including the dichroic mirrors 30A and 30B is configured to unify the individual light beams from the light sources 10A, 10B, and 10C into a single beam.

The fly-eye lenses 40A and 40B, which constitute the integrator 40, each include multiple lens parts (or cells) arranged in a predetermined formation, which is a 4×3 (length×width) matrix form in this embodiment as shown in exemplary FIGS. 13A and 13B. The cells 42 in the fly-eye lens 40B are positioned opposite the corresponding cells 41 in the fly-eye lens 40A, respectively. The fly-eye lens 40A is positioned at or around the focal positions of the fly-eye lens 40B, while the fly-eye lens 40B is positioned at or around the focal positions of the fly-eye lens 40A. Accordingly, once the light beam is incident on the integrator 40, the light beam is split into multiple light beams by the fly-eye lens 40A, and the beams are then focused close to a surface of the fly-eye lens 40B which is located facing the projected image, thereby forming secondary light source surfaces or light source images. This secondary light source surfaces are positioned on a conjugate plane of the incident pupil in the projection optical system 70. However, this secondary light source surfaces may not be positioned on the conjugate plane of the incident pupil in the projection optical system 70 precisely. Alternatively, it may be simply positioned within an allowable design range. Note that the fly-eye lenses 40A are 40B may be integrated, that is, may be implemented by a single lens.

Generally, any of the light beams from the light sources 10A, 10B, and 10C exhibits non-uniform intensity distribution on a plane perpendicular to a travel direction thereof. If such a light beam is led to the illumination region 60A (or the irradiated surface), then the illumination distribution thereon may also be non-uniform. As described above, the light beam from the light sources 10A, 10B, and 10C is converted into the multiple light beams. Then, the light beams are led to the illumination region 60A and overlapped thereon. This enables the illumination distribution on the illumination region 60A to be made uniform.

The condenser lens 50 has a function of converging the light beams from the integrator 40, so that the illumination region 60A is irradiated while the converged light beams are overlapped thereon.

The spatial modulation device 60 has a function of subjecting the light beams from the illumination optical system 1A to the two-dimensional modulation, based on color image signals corresponding to the wavelengths of the light beams from the light sources 10A, 10B, and 10C. This makes it possible to create optical images. This spatial modulation device 60 may be a light-transmitting device as shown in FIGS. 2A and 2B. One example thereof is a light-transmitting type liquid crystal panel.

[Features of Structure of Projector 1]

Now, an explanation will be give below of features of the projector 1 according to the first embodiment.

[First Feature]

Since all of the light sources 10A, 10B, and 10C have total three or more light-emitting spots 11B, the light sources emit the light beams of two or more wavelengths (R, G and B light beams in this embodiment). Moreover, at least one of the light sources 10A, 10B, and 10C (called a "first light source" herein) is provided with the multiple light-emitting spots 11B for emitting the light beams of the same wavelength (one of R, G, and B light beams in this embodiment) from the solid-state light-emitting device 11. In other words, in this embodiment, three or more of the light-emitting spots are provided within the whole of one or more light sources, to allow the whole of one or more light sources to emit light beams in two or more wavelength bands different from one another, and the solid-state light emitting device in a first light source which is at least one of the one or more light sources, has a plurality of light-emitting spots which emit light in the same wavelength band.

Figure 14A:
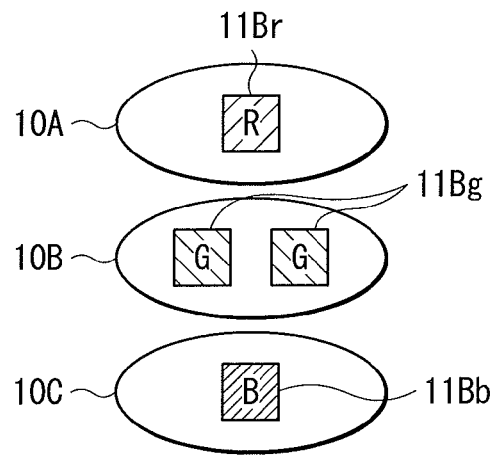
FIG. 14A schematically shows an exemplary arrangement of light-emitting spots formed on individual light sources in the projector of FIGS. 1A and 1B.
Figure 14B:
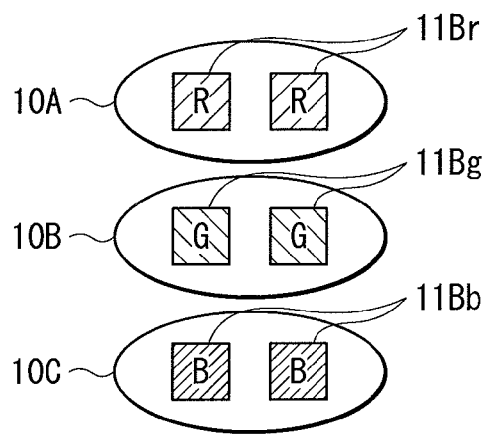
FIG. 14B schematically shows another exemplary arrangement of light-emitting spots formed on individual light sources in the projector of FIGS. 1A and 1B.
Figure 14C:
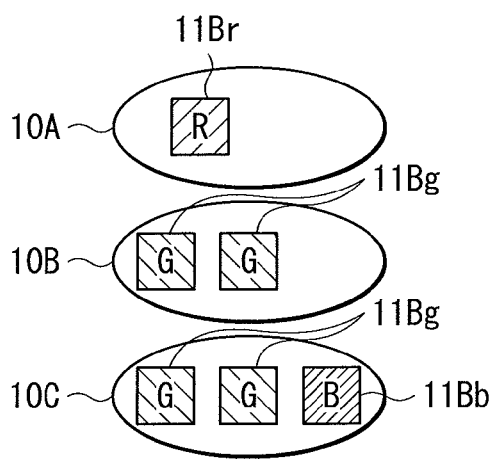
FIG. 14C schematically shows still another exemplary arrangement of light-emitting spots formed on individual light sources in the projector of FIGS. 1A and 1B.

Specifically, as shown in exemplary schematic diagrams shown in FIGS. 14A to 14C, red light-emitting spots 11Br, green light-emitting spots 11Bg, and blue light-emitting spots 11Bb are placed on the light sources 10A, 10B, and 10C.

Referring to FIG. 14A, the light source 10A has a single R light-emitting spot 11Br on the solid-state light-emitting device 11. The light source 10B, which corresponds to the first light source, has two green light-emitting spots 11Bg thereon. The light source 10C has a single B light-emitting spot 11Bb thereon.

Referring to FIG. 14B, the light source 10A, which corresponds to the first light source, has two R light-emitting spots 11Br on the solid-state light-emitting device 11. The light source 10B, which also correspond to the first light source, has two G light-emitting spots 11Bg thereon. The light source 10C, which also correspond to the first light source, has two B light-emitting spots 11Bb thereon.

Referring to FIG. 14C, the light source 10A has a single R light-emitting spot 11Br on the solid-state light-emitting device 11. The light source 10B, which corresponds to the first light source, has two G light-emitting spots 11Bg thereon. The light source 10C, which also corresponds to the first light source, has two G light-emitting spots 11Bg and a single B light-emitting spot 11Bb thereon. Particularly, the light source 10C has, in addition to the multiple light-emitting spots for emitting light beams of the same wavelength (G light beams in this embodiment), the one or more light-emitting spots for emitting light beams of a wavelength different from the same wavelength on the device 11 (B light beam in this embodiment).

[Second Feature]

Consider a case in the first embodiment where at least one of the light sources 10A, 10B, and 10C (called a "second light source" herein) is equipped with the chips 11A formed of LDs, and has the multiple light-emitting spots 11B on the chips. Note that the second light source may be the first light source or may be independent of it. In this case, it is preferable that the second light source have the following structure.

Specifically, the minor axes of the far field patterns (FFPs) of the light beams from the light-emitting spots 11B are aligned or substantially aligned with the minor axis on a plane perpendicular to the optical axis of the optical member. For example, if the optical member is the integrator 40 of FIGS. 1A and 1B, the minor axes of the FFPs of the light beams from the light-emitting spots 11B are aligned or substantially aligned with the Y axis (on the XY plane perpendicular to the Z axis) (i.e., the direction of the minor axis of the FFP in light emitted from each of the light-emitting spots substantially agrees with the direction of the minor axis of the optical member in a plane perpendicular to the optical axis of the optical member). In other words, the minor axes of the FFPs of the light beams from the light-emitting spot 11B in the second light source are aligned or substantially aligned with the minor axis of the outer shape (or the rectangular case) of the projector 1. Moreover, if the second light source emits light beams of different wavelengths, then it is preferable that the major axes of FFPs of the light beams having different wavelengths from the light-emitting spots 11B be aligned or substantially aligned with each other.

FIGS. 15A and 15B show exemplary second light sources. The second light source of FIG. 15A has two chips 11A-1 and 11A-2 that both are formed of LDs, and the chips are provided with light-emitting spots (or near field patterns (NFPs)) 11B-1 and 11B-2 including active layers 110, respectively.

Meanwhile, the second light source of FIG. 15B has a monolithic structure. This light source has the single chip 11A formed of an LD, and the chip 11A is provided with two light-emitting spots 11B-1 and 11B-2 thereon. The light-emitting spots 11B-1 and 11B-2 may emit light beams of the same wavelength or different wavelengths. In this case, the minor axes (parallel to the Y axes in this figure) of FFPs (see elliptic apertures denoted by reference numbers P11 and P12) of light beams from the light-emitting spots 11B-1 and 11B-2 are aligned with the minor axis (parallel to the Y axis) on a plane perpendicular to the optical axis of the integrator 40. In addition, the major axes (parallel to the X axes in this figure) of FFPs of the light beams from the light-emitting spots 11B-1 and 11B-2 are aligned with each other.

[Third Feature]

It is preferable that, in the first embodiment, the individual focal distances of the coupling lenses 20A, 20B, and 20C and of the fly-eye lenses 40A and 40B be set such that the sizes of light source images S which the cells 41 of the fly-eye lens 40A forms on the fly-eye lens 40B are not larger than the sizes of the corresponding cells 42 of the fly-eye lens 40B, respectively.

Figure 16:
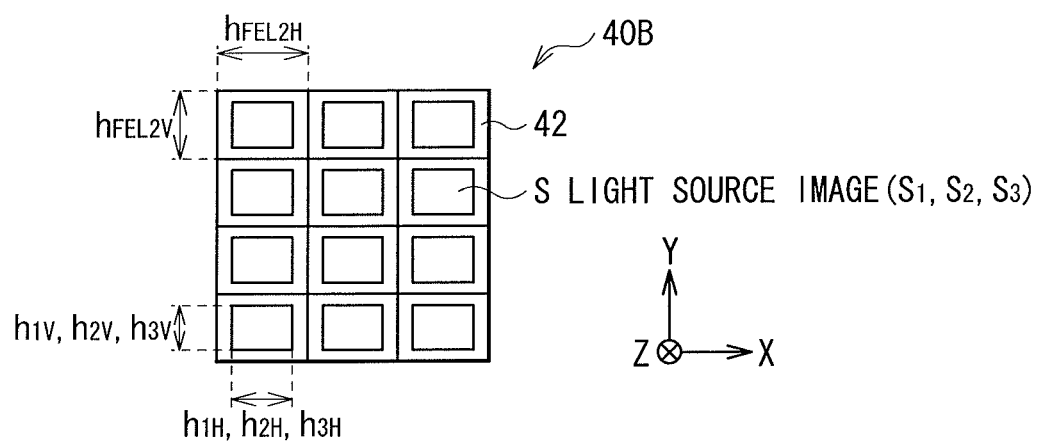
FIG. 16 schematically shows exemplary light source images on the cells of the post-fly-eye lens in the projector of FIGS. 1A and 1B.

The conditions to attain this are represented by the following equations (1) to (3). In addition, the condition is illustrated in FIG. 16. This figure shows an example in which each of the cells in fly-eye lenses 40A and 40B has a lateral/vertical length ratio (or an aspect ratio) other than 1, and this arrangement will be described in detail later.

$$h_1 = P_1 \times (f_{FEL}/f_{CL1}) \leq h_{FEL2} \qquad (1)$$

$$h_2 = P_2 \times (f_{FEL}/f_{CL2}) \leq h_{FEL2} \qquad (2)$$

$$h_3 = P_3 \times (f_{FEL}/f_{CLS}) \leq h_{FEL2} \qquad (3)$$

where $h_1$ denotes a size of a light source image S (light source image $S_1$) created by a light beam from the light source 10A, $h_2$ denotes a size of a light source image S (light source image $S_2$) created by a light beam from the light source 10B, $h_3$ denotes a size of a light source image S (light source image $S_3$) created by a light beam from the light source 10C, $P_1$ denotes a size of a light emission region in the solid-state light-emitting device 11 contained in the light source 10A, $P_2$ denotes a size of a light emission region in the solid-state light-emitting device 11 contained in the light source 10B, $P_3$ denotes a size of a light emission region in the solid-state light-emitting device 11 contained in the light source 10C, $f_{FEL}$ denotes a focal distance of the fly-eye lenses 40A and 40B, $f_{CL1}$ denotes a focal distance of the coupling lens 20A, $f_{CL2}$ denotes a focal distance of the coupling lens 20B, $f_{CL3}$ denotes a focal distance of the coupling lens 20C, and $h_{FEL2}$ denotes a size of each cell 42 in the fly-eye lens 40B.

In the equation (1), if the solid-state light-emitting device 11 in the light source 10A is composed of the single chip 11A, the $P_1$ is equal to the size of the light-emitting spot 11B in the chip 11A. Likewise, if the solid-state light-emitting device 11 in the light source 10B is composed of the single chip 11A, then the $P_2$ is equal to the size of the light-emitting spot 11B in the chip 11A. Furthermore, if the solid-state light-emitting device 11 in the light source 10C is composed of the single chip 11A, the $P_3$ is equal to the size of the light-emitting spot 11B in the chip 11A.

Meanwhile, in the equation (1), if the solid-state light-emitting device 11 in the light source 10A is composed of the multiple chips 11A, then the $P_1$ is equal to the size of the region defined by the outer frame of the light-emitting spots 11B of the chips 11A when all the chips 11A are tiled with a minimum area. Likewise, if the solid-state light-emitting device 11 in the light source 10B is composed of the multiple chips 11A, then the $P_2$ is equal to the size of the region defined by the outer frame of the light-emitting spots 11B of the chips 11A when all the chips 11A are tiled with a minimum area. Furthermore, if the solid-state light-emitting device 11 in the light source 10C is composed of the multiple chips 11A, then the $P_3$ is equal to the size of the region defined by the outer frame of the light-emitting spots 11B of the chips 11A when all the chips 11A are tiled with a minimum area. If the coupling lens 20A is formed by a combination of multiple lenses, then the $f_{CL1}$ corresponds to a combined focal distance of these lenses. Likewise, if the coupling lens 20B is formed by a combination of multiple lenses, then the $f_{CL2}$ corresponds to a unified focal distance of these lenses. Furthermore, if the coupling lens 20C is formed by a combination of multiple lenses, then the $f_{CL3}$ corresponds to a unified focal distance of these lenses.

The following equations (4) to (6), which are substantially equivalent to the equations (1) to (3), respectively, are given below. These equations are effective especially when the size of the light emission region in the solid-state light-emitting device 11 be nearly equal to the size of the solid-state light-emitting device 11 itself.

$$h_1 = W_1 \times (f_{FEL}/f_{CL1}) \leq h_{FEL2} \qquad (4)$$

$$h_2 = W_2 \times (f_{FEL}/f_{CL2}) \leq h_{FEL2} \qquad (5)$$

$$h_3 = W_3 \times (f_{FEL}/f_{CL3}) \leq h_{FEL2} \qquad (6)$$

where $W_1$ denotes a size of the solid-state light-emitting device 11 in the light source 10A, $W_2$ denotes a size of the solid-state light-emitting device 11 in the light source 10B, and $W_3$ denotes a size of the solid-state light-emitting device 11 in the light source 10C.

If the solid-state light-emitting device 11 is composed of the single chip 11A, the W is equal to the size of the chip 11A itself. Meanwhile, the device 11 is composed of the multiple chips 11A, the W is equal to the size of an area defined by tiling all the chips 11A.

In this embodiment, if the cells 41 and 42 of the fly-eye lenses 40A and 40B have an aspect ratio other than 1 as shown in exemplary FIGS. 13A and 13B, it is preferable that the respective focal distances of the coupling lenses 20A, 20B and 20C and of the fly-eye lenses 40A and 40B have the relationship defined by the following equations (7) to (12).

In addition, it is more preferable that ratios of vertical and horizontal focal distances (or anamorphic ratio) in the coupling lenses 20A, 20B and 20C ($f_{CL1H}/f_{CL1V}$, $f_{CL2H}/f_{CL2V}$, and $f_{CL3H}/f_{CL3V}$) be each equal to the reciprocal of a ratio of vertical and horizontal lengths of each cell 42 in the fly-eye lens 40B ($h_{FEL2V}/h_{FEL2H}$). Also, it is more preferable that the illumination optical system 1A employ an anamorphic optical system. For example, consider that each cell 42 of the fly-eye lens 40B has a rectangular shape, and its long side extends along a first direction such as a horizontal direction. In this case, it is preferable that the focal distances $f_{CL1V}$, $f_{CL2V}$, and $f_{CL3V}$ of the coupling lenses 20A, 20B and 20C be longer than the focal distances $f_{CL1H}$, $f_{CL2H}$, and $f_{CL3H}$ thereof, respectively. The relationship represented by the equations (7) to (12) is illustrated in FIG. 16.

$$h_{1H}=P_{1H}\times(f_{FELH}/f_{CL1H})\le h_{FEL2H} \quad (7)$$

$$h_{2H}=P_{2H}\times(f_{FELH}/f_{CL2H})\le h_{FEL2H} \quad (8)$$

$$h_{3H}=P_{3H}\times(f_{FELH}/f_{CL3H})\le h_{FEL2H} \quad (9)$$

$$h_{1V}=P_{1V}\times(f_{FELV}/f_{CL1V})\le h_{FEL2V} \quad (10)$$

$$h_{2V}=P_{2V}\times(f_{FELV}/f_{CL2V})\le h_{FEL2V} \quad (11)$$

$$h_{3V}=P_{3V}\times(f_{FELV}/f_{CL3V})\le h_{FEL2V} \quad (12)$$

where $h_{1H}$ denotes a size (width) of a light source image S (light source image $S_1$) along a first direction (for example, the horizontal direction), which is created by a light beam from the light source 10A, $h_{2H}$ denotes a size (width) of a light source image S (light source image $S_2$) along the first direction (for example, the horizontal direction), which is created by a light beam from the light source 10B, $h_{3H}$ denotes a size (width) of a light source image S (light source image $S_3$) along the first direction (for example, the horizontal direction), which is created by a light beam from the light source 10C, $h_{1V}$ denotes a size (width) of a light source image S (light source image $S_1$) along a second direction perpendicular to the first direction (for example, the vertical direction), which is created by a light beam from the light source 10A, $h_{2V}$ denotes a size (width) of a light source image S (light source image $S_2$) along the second direction (for example, the vertical direction), which is created by a light beam from the light source 10B, $h_{3V}$ denotes a size (width) of a light source image S (light source image $S_3$) along the second direction (for example, the vertical direction), which is created by a light beam from the light source 10C, $P_{1H}$ denotes a size (width) of the light emission region along the first direction or a direction corresponding thereto, which is located on the solid-state light-emitting device 11 contained in the light source 10A, $P_{2H}$ denotes a size (width) of the light emission region along the first direction or the direction corresponding thereto, which is located on the solid-state light-emitting device 11 contained in the light source 10B, $P_{3H}$ denotes a size (width) of the light emission region along the first direction or a direction corresponding thereto, which is located on the solid-state light-emitting device 11 contained in the light source 10C, $P_{1V}$ denotes a size (width) of the light emission region along the second direction or the direction corresponding thereto, which is located on the solid-state light-emitting device 11 contained in the light source 10A, $P_{2V}$ denotes a size (width) of the light emission region along the second direction or the direction corresponding thereto, which is located on the solid-state light-emitting device 11 contained in the light source 10B, $P_{3V}$ denotes a size (width) of the light emission region along the second direction or a direction corresponding thereto, which is located on the solid-state light-emitting device 11 contained in the light source 10C, $f_{FELH}$ denotes a focal distance of the fly-eye lenses 40A and 40B in the first direction, $f_{FELV}$ denotes a focal distance of the fly-eye lenses 40A and 40B in the second direction, $f_{CL1H}$ denotes a focal distance of the coupling lens 20A in the first direction or the direction corresponding thereto, $f_{CL2H}$ denotes a focal distance of the coupling lens 20B in the first direction or the direction corresponding thereto, $f_{CL3H}$ denotes a focal distance of the coupling lens 20C in the first direction or the direction thereto, $f_{CL1V}$ denotes a focal distance of the coupling lens 20A in the second direction or the direction corresponding thereto, $f_{CL2V}$ denotes a focal distance of the coupling lens 20B in the second direction or a direction corresponding thereto, $f_{CL3V}$ denotes a focal distance of the coupling lens 20C in the second direction or a direction corresponding thereto, $h_{FEL2H}$ denotes a size (width) of one of the cells 42 in the fly-eye lens 40B along the first direction, and $h_{FEL2V}$ denotes a size (width) of one of the cells 42 in the fly-eye lens 40B along the second direction.

In the above equations, the "first direction or a direction corresponding thereto" represents the first direction, if the light sources 10A, 10B, and 10C, and the coupling lenses 20A, 20B and 20C are aligned with the optical axis of the integrator 40. In addition, the "first direction or a direction corresponding thereto" represents the direction corresponding to the first direction, if light sources 10A, 10B, and 10C and the coupling lenses 20A, 20B and 20C are not aligned with the optical axis of the integrator 40. In this case, the direction corresponding to the first direction is determined based on the layout of the optical devices on the optical paths between the respective light sources 10A, 10B, and 10C and the integrator 40.

Likewise, in the above equations, the "second direction or a direction corresponding thereto" represents the second direction, if the light sources 10A, 10B, and 10C, and the coupling lenses 20A, 20B and 20C are aligned with the optical axis of the integrator 40. In addition, the "second direction or a direction corresponding thereto" represents the direction corresponding to the second direction, if light sources 10A, 10B, and 10C and the coupling lenses 20A, 20B and 20C are not aligned with the optical axis of the integrator 40. In this case, the direction corresponding to the second direction is determined based on the layout of the optical devices on the optical paths between the respective light sources 10A, 10B, and 10C and the integrator 40.

If the solid-state light-emitting device 11 in the light source 10A is composed of the single chip 11A, then the $P_{1H}$ is equal to the size (width) of the light-emitting spot 11B on the chip 11A along the first direction or the direction corresponding thereto. Likewise, if the solid-state light-emitting device 11 in the light source 10B is composed of the single chip 11A, then the $P_{2H}$ is equal to the size (width) of the light-emitting spot 11B on the chip 11A along the first direction or the direction corresponding thereto. Furthermore, if the solid-state light-emitting device 11 in the light source 10C is composed of the single chip 11A, then the $P_{3H}$ is equal to the size (width) of the light-emitting spot 11B on the chip 11A along the first direction or the direction corresponding thereto.

Meanwhile, if the solid-state light-emitting device 11 in the light source 10A is composed of the multiple chips 11A, the $P_{1H}$ is equal to the size (width) of an area, along the first direction or the direction corresponding thereto, which is defined by the outer frame of the light-emitting spots 11B of the chips 11A when all the chips 11A are tiled with a minimum area. Likewise, if the solid-state light-emitting device 11 in the light source 10B is composed of the multiple chips 11A, the $P_{2H}$ is equal to the size (width) of an area, along the first direction or the direction corresponding thereto, which is defined by the outer frame of the light-emitting spots 11B of the chips 11A when all the chips 11A are tiled with a minimum area. Furthermore, when the solid-state light-emitting device 11 in the light source 10C is composed of the multiple chips 11A, the $P_{3H}$ is equal to the size (width) of an area, along the first direction or the direction corresponding thereto, which is defined by the outer frame of the light-emitting spots 11B of the chips 11A when all the chips 11A are tiled with a minimum area.

If the solid-state light-emitting device 11 in the light source 10A is composed of the single chip 11A, then the $P_{1V}$ is equal to the size (width) of the light-emitting spot 11B on the chip 11A along the second direction or the direction corresponding thereto. Likewise, if the solid-state light-emitting device 11 in the light source 10B is composed of the single chip 11A, then the $P_{2V}$ is equal to the size (width) of the light-emitting spot 11B on the chip 11A along the second direction or the direction corresponding thereto. Furthermore, if the solid-state light-emitting device 11 in the light source 10C is composed of the single chip 11A, then the $P_{3V}$ is equal to the size (width) of the light-emitting spot 11B on the chip 11A along the second direction or the direction corresponding thereto.

Meanwhile, if the solid-state light-emitting device 11 in the light source 10A is composed of the multiple chips 11A, then the $P_{1V}$ is equal to the size (width) of an area, along the second direction or the direction corresponding thereto, which is defined by the outer frame of the light-emitting spots 11B of the chips 11A when all the chips 11A are tiled with a minimum area. Likewise, if the solid-state light-emitting device 11 in the light source 10B is composed of the multiple chips 11A, then the $P_{2V}$ is equal to the size (width) of an area, along the second direction or the direction corresponding thereto, which is defined by the outer frame of the light-emitting spots 11B of the chips 11A when all the chips 11A are tiled with a minimum area. Furthermore, if the solid-state light-emitting device 11 in the light source 10C is composed of the multiple chips 11A, then the $P_{3V}$ is equal to the size (width) of an area, along the second direction or the direction corresponding thereto, which is defined by the outer frame of the light-emitting spots 11B of the chips 11A when all the chips 11A are tiled with a minimum area.

Figure 17:
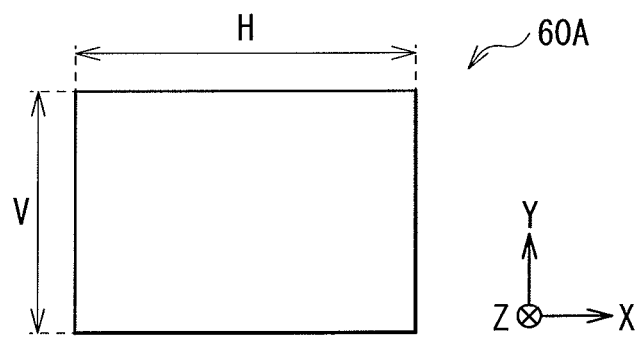
FIG. 17 schematically shows a size of an illumination region on a spatial modulation device in the projector of FIGS. 1A and 1B.

In this embodiment, if each of the cells 41 and 42 in the fly-eye lenses 40A and 40B has an aspect ratio other than 1, then it is preferable that the aspect ratios of each cell 41 in the fly-eye lens 40A and of the illumination region 60A have a relationship defined by the following equation (13). Note that the aspect ratio (H/V) (see FIG. 17) of the illumination region 60A is correlated with the resolution of the spatial modulation device 60. For example, if the resolution (VGA) of the spatial modulation device 60 is 640×480, then the aspect ratio (H/V) of the illumination region 60A is 640/480. Moreover, if the resolution (WVGA) of the spatial modulation device 60 is 800×480, then the (H/V) of the illumination region 60A is 800/480.

$$h_{FEL1H}/h_{FEL1V}=H/V \tag{13}$$

where $h_{FEL1H}$ denotes a size (width) of each cell in the fly-eye lens 40A along the first direction, $h_{FEL1V}$ denotes a size (width) of each cell in the fly-eye lens 40A in the second direction, H denotes a size (width) of the illumination region 60A along the first direction, and V denotes a size (width) of the illumination region 60A along the second direction.

[Fourth Feature]

In this embodiment, it is preferable that the focal distances and numerical apertures (NAs) of the coupling lenses 20A, 20B and 20C be set such that the size of light beams incident on the coupling lenses 20A, 20B and 20C is not larger than the size of these coupling lenses. These conditions are represented by the following equations (14) to (16).

$$\phi_{CL1}=2\times f_{CL1}\times NA_1 \leq h_{CL1} \tag{14}$$

$$\phi_{CL2}=2\times f_{CL2}\times NA_2 \leq h_{CL2} \tag{15}$$

$$\phi_{CL3}=2\times f_{CL3}\times NA_3 \leq h_{CL3} \tag{16}$$

where $\phi_{CL1}$: denotes a size of a light beam incident on the coupling lens 20A, $\phi_{CL2}$: denotes a size of a light beam incident on the coupling lens 20B, $\phi_{CL3}$: denotes a size of a light beam incident on the coupling lens 20C, $NA_1$ denotes an NA of the coupling lens 20A, $NA_2$ denotes an NA of the coupling lens 20B, $NA_3$ denotes an NA of the coupling lens 20C, $h_{CL1}$ denotes a size of the coupling lens 20A, $h_{CL2}$ denotes a size of the coupling lens 20B, and $h_{CL3}$ denotes a size of the coupling lens 20C.

In this embodiment, if the coupling lenses 20A, 20B and 20C have the aspect ratio other than 1, then it is preferable that the focal distances and NAs of the coupling lenses 20A, 20B and 20C have a relationship defined by the following equations (17) to (22).

$$\phi_{CL1H}=2\times f_{CL1H}\times NA_{1H} \leq h_{CL1H} \tag{17}$$

$$\phi_{CL2H}=2\times f_{CL2H}\times NA_{2H} \leq h_{CL2H} \tag{18}$$

$$\phi_{CL3H}=2\times f_{CL3H}\times NA_{3H} \leq h_{CL3H} \tag{19}$$

$$\phi_{CL1V}=2\times f_{CL1V}\times NA_{1V} \leq h_{CL1V} \tag{20}$$

$$\phi_{CL2V}=2\times f_{CL2V}\times NA_{2V} \leq h_{CL2V} \tag{21}$$

$$\phi_{CL3V}=2\times f_{CL3V}\times NA_{3V} \leq h_{CL3V} \tag{22}$$

where $\phi_{CL1H}$ denotes a size (width) of a light beam incident on the coupling lens 20A along the first direction (for example, the horizontal direction) or the direction corresponding thereto, $\phi_{CL2H}$ denotes a size (width) of a light beam incident on the coupling lens 20B along the first direction (for example, the horizontal direction) or the direction corresponding thereto, $\phi_{CL3H}$ denotes a size (width) of a light beam incident on the coupling lens 20C along the first direction (for example, the horizontal direction) or the direction corresponding thereto, $\phi_{CL1V}$ denotes a size (width) of a light beam incident on the coupling lens 20A along the second direction (for example, the vertical direction) or the direction corresponding thereto, $\phi_{CL2V}$ denotes a size (width) of a light beam incident on the coupling lens 20B along the second direction (for example, the vertical direction) or the direction corresponding thereto, $\phi_{CL3V}$ denotes a size (width) of a light beam incident on the coupling lens 20C along the second direction (for example, the vertical direction) or the direction corresponding thereto, $NA_{1H}$ denotes an NA of the coupling lens 20A along the first direction or the direction corresponding thereto, $NA_{2H}$ denotes an NA of the coupling lens 20B along the first direction or the direction corresponding thereto, $NA_{3H}$ denotes an NA of the coupling lens 20C along the first direction or the direction corresponding thereto, $NA_{1V}$ denotes an NA of the coupling lens 20A along the second direction or the direction corresponding thereto, $NA_{2V}$ denotes an NA of the coupling lens 20B along the second direction or the direction corresponding thereto, $NA_{3V}$ denotes an NA of the coupling lens 20C along the second direction or the direction corresponding thereto, $h_{CL1H}$ denotes a size (width) of the coupling lens 20A along the first direction or the direction corresponding thereto, $h_{CL2H}$ denotes a size (width) of the coupling lens 20B along the first direction or the direction corresponding thereto, $h_{CL3H}$ denotes a size (width) of the coupling lens 20C along the first direction or the direction corresponding thereto, $h_{CL1V}$ denotes a size (width) of the coupling lens 20A along the second direction or the direction corresponding thereto, $h_{CL2V}$ denotes a size (width) of the coupling lens 20B along the second direction or the direction corresponding thereto, and $h_{CL3V}$ denotes a size (width) of the coupling lens 20C along the second direction or the direction corresponding thereto.

[Operations and Effects of Projector 1]

An explanation will be given below of operations and effects of the projector 1 according to the first embodiment.

As described with reference to exemplary FIGS. 14A to 14C, all the light sources 10A, 10B, and 10C are provided with the solid-state light-emitting devices 11 on which the total three or more light-emitting spots 11B are formed. In addition, from these light-emitting spots 11B, the light beams of two or more different wavelengths (red, green, and blue light beams in the embodiment) are emitted. Moreover, in at least one of the light source 10A, 10B, and 10C (first light source), the solid-state light-emitting device 11 has the multiple light-emitting spots 11B from which the light beams of the same wavelength (any of red, green, and blue light beams in the embodiment) are emitted. In other words, the three or more of the light-emitting spots are provided within the whole of one or more light sources, to allow the whole of one or more light sources to emit the light beams in the two or more wavelength bands different from one another, and the solid-state light emitting device in the first light source which is at least one of the one or more light sources, has the plurality of light-emitting spots which emit the light in the same wavelength band.

A typical projector is designed to display color images by using light beams of three primary colors, such as red, green, and blue light beams. There may be a case, however, that intensities or luminance properties may be different for the respective colors among devices (or chips in a solid-state light-emitting device) which emit the light beams of the three primary colors, respectively. In this case, it is difficult to increase the luminance of illumination light as a whole output from the illumination system. In this existing case, it is difficult to increase the luminance of illumination light as a whole output from an illumination unit (or an illumination light system). This is because in order to adjust the white balance of the illumination light as a whole, the light beam of the lower intensity needs to be used as a reference. For example, if the green light beam is darker than the red and blue light beams, then the luminance of the red and blue light beams needs to be adjusted or adapted to that of the green light upon white balance adjustment.

In contrast, in this embodiment, the projector 1 has the light sources 10A, 10B, and 10C configured above. Thus, when the light beams in two or more wavelength bands (here, red light, green light, and blue light) is emitted from the illumination optical system 1A as the illumination light, it is made possible to adjust the relative light emission intensities between the light of the respective wavelength bands. Consequently, when white balance of illumination light as a whole is adjusted as in the past, it is possible to avoid making an adjustment based on a relatively lower light emission intensity, and therefore, it is made possible to improve luminance of the illumination light. Furthermore, the plurality of light-emitting spots 11B which emit the light in the same wavelength band are provided in at least one of the one or more light sources (for example, the first light source). This makes it possible to eliminate any optical unification or unifying members for unifying the light beams emitted from those light-emitting spots 11B. It is thus possible to achieve compactness of the projector 1 as a whole, or to prevent the projector 1 from being enlarged as well.

As described with reference to exemplary FIGS. 15A and 15B, in the projector 1 of the first embodiment, at least one of the light sources 10A, 10B, and 10C (second light source) may be provided with the solid-state light-emitting devices 11 on which the multiple light-emitting spots 11B are formed on the multiple chips 11A composed of LDs. The projector 1 of this structure provides the following operations and effects.

The minor axes of FFPs of the light beams from the light-emitting spots 11B may be adjusted to be substantially aligned with the minor axis on a plane perpendicular to the optical axis of the integrator 40. Because of this adjustment, the minor axes of FFPs of the light beams from the light-emitting spots 11B are also substantially aligned with the minor axis of the outer case of the projector 1. This contributes to further compactness of the projector 1.

Furthermore, if the second light source emits light beams of two or more different wavelengths, then the major axes of FFPs of the light beams from the light-emitting spots 11B are adjusted to be substantially aligned with one another. In this structure, using an I-cut lens makes it possible to decrease the loss of the light beam in the illumination optical system of the projector 1. Specifically, an optical effective range may be sacrificed in portions subjected to "I-cut". However, the light loss is advantageously reduced by matching the one axes of FFPs of light beams from the LDs with a direction to which the "I-cut" is performed (a direction in which an effective diameter is wide).

As described with reference to exemplary FIG. 16, in the projector 1 of the first embodiment, the focal distances ($f_{CL1}$, $f_{CL2}$, $f_{CL3}$, and $f_{FEL}$) of the coupling lenses 20A, 20B and 20C and of the fly-eye lenses 40A and 40B may be set such that the sizes of the light source images which the cells 41 of the fly-eye lens 40A forms on the fly-eye lens 40B are not larger than the sizes of the corresponding cells 42 of the fly-eye lens 40B. The projector 1 of this structure gives the following operations and effects.

The solid-state light-emitting device 11 is adapted to emit one or more light beams from the light emission region including one or more light-emitting spots of a dot or non-dot shape, and this device 11 is formed by one or more LEDs, OLEDs or LDs. Therefore, even if the fly-eye lens 40B is positioned at the focal positions of the fly-eye lens 40A, the light source images S which the cells of the fly-eye lens 40A form on the fly-eye lens 40B are not perfect dot-shape, and each of the images S has a considerable size (see FIG. 16). However, in the projector 1 of this embodiment, since it is unlikely that one light source image S is formed across the plurality of cells, the light incident on the fly-eye lens 40B reaches the illumination region 60A efficiently. It is thus possible to improve the light use efficiency of the illumination optical system 1A.

In addition, if each of the cells 41 and 42 in the fly-eye lenses 40A and 40B has an aspect ratio other than 1, then the focal distances ($f_{CL1H}$, $f_{CL2H}$, $f_{CL3H}$, $f_{CL1V}$, $f_{CL2V}$, $f_{CL3V}$, $f_{FELH}$, and $f_{FELV}$) of the coupling lenses 20A, 20B and 20C and the focal distances ($f_{FELH}$ and $f_{FELV}$) of the fly-eye lenses 40A and 40B may be set in consideration of this aspect ratio. It is thus possible to further improve the light use efficiency of the illumination optical system 1A.

Moreover, in the projector 1 of the first embodiment, if the coupling lenses 20A, 20B and 20C have an aspect ratio other than 1, then the focal distances ($f_{CL1H}$, $f_{CL2H}$, $f_{CL3H}$, $f_{CL1V}$, $f_{CL2V}$, and $f_{CL3V}$) and the NAs ($NA_{1H}$, $NA_{2H}$, $NA_{3H}$, $NA_{1V}$, $NA_{2V}$, and $NA_{3V}$) of the coupling lenses 20A, 20B and 20C may be set in consideration of this aspect ratio. It is thus possible to further improve the light use efficiency of the illumination optical system 1A.

Furthermore, in the projector 1 of the first embodiment, if the traveling-direction-angles of the light sources 10A, 10B, and 10C differ from one another, then the focal distances ($f_{CL1H}$, $f_{CL2H}$, $f_{CL3H}$, $f_{CL1V}$, $f_{CL2V}$, and $f_{CL3V}$) and the NAs ($NA_{1H}$, $NA_{2H}$, $NA_{3H}$, $NA_{1V}$, $NA_{2V}$, and $NA_{3V}$) of the coupling lenses 20A, 20B and 20C may be set in consideration on this difference. It is thus possible to further improve the light use efficiency of the illumination optical system 1A.

Up to this point, the projector 1 of the first embodiment has been described. Now, other embodiments (second and third embodiments) will be explained below. Note that in the following embodiments, the same components as those in the first embodiment are given the same reference numbers, and the explanation thereof will be omitted.

Second Embodiment

FIGS. 18A and 18B show a schematic structure of a projector according to a second embodiment of the technology (called a "projector 3" herein). Note that this projector 3 corresponds to a concrete example of the "projection display unit" according to one embodiment of the technology. FIG. 18A shows the schematic structure of the projector 3 as seen from the above or on a Y axis, and FIG. 18B shows it as seen from one side or on an X axis.

A structure of the projector 3 differs from that of the projector 1 in the spatial modulation device and illumination optical system. Concretely, the projector 3 includes a reflective spatial modulation device 60 and an illumination optical system 3A. Accordingly, a description of the projector 3 will be mainly focused on different points from the projector 1, and the same points will be omitted as deemed appropriate.

The illumination optical system 3A of the projector 3 includes a condenser lens 50A instead of the condenser lens 50 of the illumination optical system 1A in the projector 1. This condenser lens 50A has a function of converting the light beams from the integrator into collimated light beams and delivering the beams to a condenser lens 50B through a polarization beam splitter 51.

In this embodiment, as described above, the spatial modulation device 60 may be implemented by a reflective device such as a reflective liquid crystal panel. Therefore, the projector 3 further includes the condenser lens 50B and the polarization beam splitter 51 in contrast to the projector 1. The polarization beam splitter 51 is an optical device which has a function of selectively allowing incident light to pass through or be reflected. Specifically, once light is incident on the polarization beam splitter 51, a specific polarized component, such as a P-polarized component, in the incident light passes through and the other polarized component, such as an S-polarized component, is reflected. The spatial modulation device 60 has a function of modulating the incident light beam and reflecting the incident light beam while changing the polarization thereof. Specifically, once the light beams from the illumination optical system 3A enter the polarization beam splitter 51, specific polarized light beams, such as S polarized light beams, contained in the light beams are selectively reflected by the polarization beam splitter 51, and the reflected beams are incident on the spatial modulation device 60. Subsequently, the incident light beams are reflected by this spatial modulation device 60 while the polarization of the incident light beams is changed. This polarized light beams (optical images), such as P polarized light beams, are output from the spatial modulation device 60, and the light beams then pass through the polarization beam splitter 51, entering a projection optical system 70. The condenser lens 50B has a function of focusing the light beams from the light sources through the integrator 40, condenser lens 50A, and polarization beam splitter 51, so that the focused light beams are irradiated on the illumination region 60A while being overlapped thereon.

The projector 3 of this embodiment configured above has substantially the same behavior as the projector 1 of the first embodiment does. Therefore, the projector provides substantially the same effects as the projector does.

As to the size of the projector 3A, the width along the X axis on a plane (XY plane) perpendicular to the optical axis of the integrator 40 is relatively long, in particular. Thus, by aligning the minor axes of FFPs of the light beams from light-emitting spots 11B with the minor axis (Y axis) of the outer shape of the projector 3, the projector 3 as a whole is further advantageously made compact.

Third Embodiment

Figures 19A, 19B:
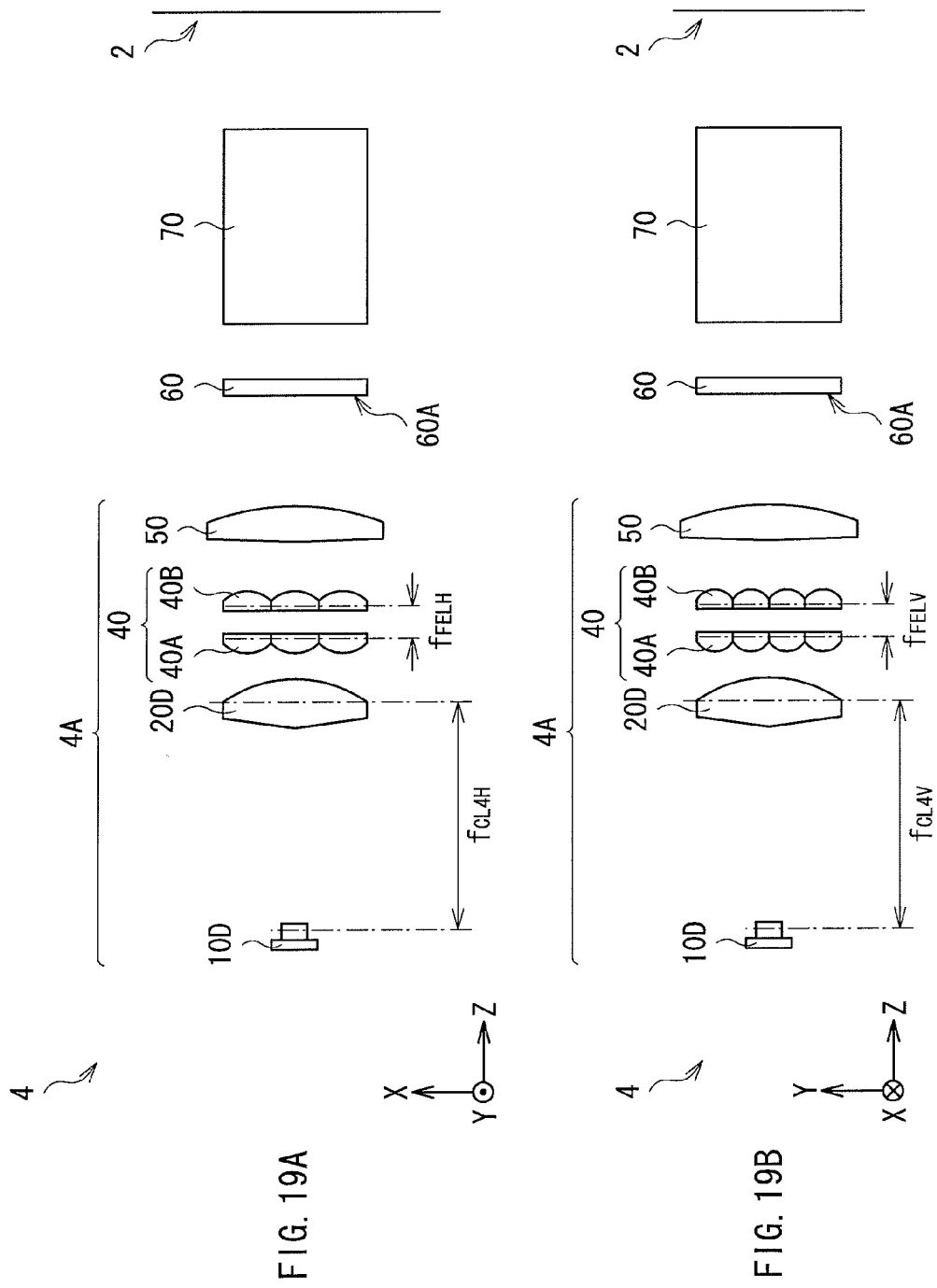
FIG. 19A shows a schematic structure of a projector according to a third embodiment of the technology as seen from the above.
FIG. 19B shows the schematic structure of the projector as seen from one side.

FIGS. 19A and 19B show a schematic structure of a projector according to a third embodiment of the technology (called a "projector 4" herein). Note that this projector 4 corresponds to a concrete example of the "projection display unit" according to one embodiment of the technology. FIG. 19A shows the schematic structure of the projector 4 as seen from the above or the X axis, and FIG. 19B shows it as seen from one side or the Y axis. Moreover, FIG. 20A shows the optical paths as seen from the top of the projector 4 or on the Y axis, and FIG. 20B shows the optical paths as seen from the side of the projector 4 or on the Y axis.

A structure of the projector 4 of this embodiment differs from that of the projector 1 in the illumination optical system. Concretely, the projector 4 includes an illumination optical system 4A. Accordingly, a description of the projector 4 will be mainly focused on different points from the projector 1, and the same points will be omitted as deemed appropriate.

The illumination optical system 4A of the projector 4 does not include the light sources 10A, 10B, and 10C and the dichroic mirrors 30A and 30B, but includes a light source 10D instead. This light source 10D is placed on the optical axis of a coupling lens 20D. The illumination optical system 4A is configured such that a light beam from the light source 10D directly enters the coupling lens 20D.

The light source 10D includes, but not limited to, the solid-state light-emitting device 11 and a package 12 in which the device 11 mounted on a substrate material is supported and covered. In this case, the device 11 may be composed of the one or more chips 11A of the upper surface emitting type. Alternatively, the light source 10D may have a can shape. In other words, the light source 10D may include the stem 13, the cap 14, and the solid-state light-emitting device 11 located within an inner space defined by the stem 13 and the cap 14. In addition, the device 11 may be composed of the one or more chips 11A of the side surface emitting type.

The solid-state light-emitting device 11 in the light source 10D has the light emission region composed of the one or more light-emitting spots of a dot or non-dot shape, and from this the light emission region, the light beam is emitted. The solid-state light-emitting device 11 in the light source 10D may be composed of the single chip 11A for emitting a light beam of a predetermined wavelength, or the multiple chips 11A for emitting light beams of the same wavelength or different wavelengths. If the device 11 is composed of the multiple chips 11A, then the chips 11A may be arranged laterally in a line or arranged in a matrix form.

The chip 11A may be an LED, OLED, or LD. If the solid-state light-emitting device 11 in the light source 10D is composed of the multiple chips 11A, then all the chips 11A may be LEDs, OLEDs, or LDs. Alternatively, the chips 11A may be a combination of LEDs and OLEDs, LEDs and LDs, or OLEDs and LDs. In any case, however, it is preferable that the chips 11A include at least one LD.

If the solid-state light-emitting device 11 in the light source 10D is composed of the multiple chips 11A, then the chips 11A may be ones for emitting light beams of the same wavelength or different wavelengths. Moreover, all of the chips 11A may be ones for emitting light beams having a wavelength of 400 nm to 500 nm (B), 500 nm to 600 nm (G), or 600 nm to 700 nm (R). Furthermore, the chips 11A may be a combination of ones for emitting light beams having a wavelength of 400 nm to 500 nm (B), 500 nm to 600 nm (G), and 600 nm to 700 nm (R).

In this embodiment, the solid-state light-emitting device 11 in the light source 10D has total three or more light-emitting spots from which light beam of two or more different wavelengths (R, G, and B light beams) are emitted, similarly to the light sources 10A, 10B, and 10C of the first embodiment. In addition, the light source 10D serves as the first light source. In other words, the solid-state light-emitting device 11 in the light source 10D includes the multiple light-emitting spots from which light beams of the same wavelength (one of R, G, and B light beams) are emitted. Specifically, referring to exemplary FIG. 21, the solid-state light-emitting device 11 in the light source 10D has an R light-emitting spot 11Br, two G light-emitting spots 11Bg, and a B light-emitting spot 11Bb. Thus, the device 11 in the light source 10D (first light source) is provided with, in addition to the multiple light-emitting spots for emitting light beams of the same wavelength (G light-emitting spots 11Bg in this embodiment), one or more light-emitting spots for emitting light beams of different wavelengths from the same wavelength (R light-emitting spot 11Br and B light-emitting spot 11Bb in this embodiment). Consequently, the projector 4 of this embodiment configured above has substantially the same behavior as the projector 1 of the first embodiment does. Therefore, the projector 4 provides substantially the same effects as the projector 1 does.

Modifications

Next, an explanation will be given below of modifications of the first to third embodiments (called "modifications 1 to 3", respectively). Note that in the following modifications, the same components as those in the first to third embodiments are given the same reference numbers, and the explanation thereof will be omitted.

Modification 1

Figure 22A:
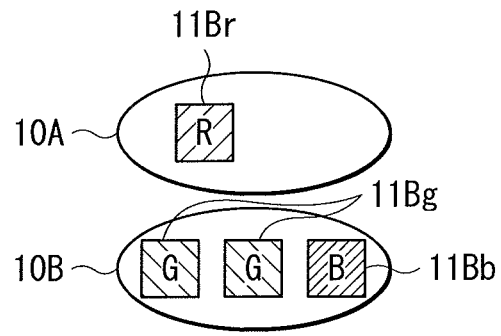
FIG. 22A schematically shows an exemplary arrangement of light-emitting spots formed on individual light sources in the projector of modification 1.
Figure 22B:
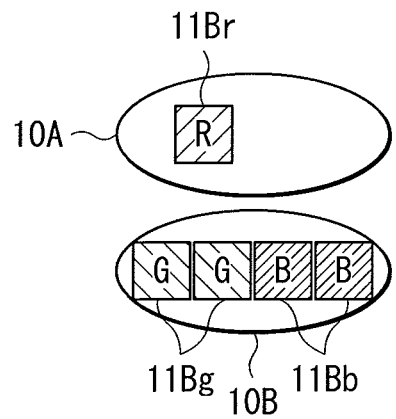
FIG. 22B schematically shows another exemplary arrangement of light-emitting spots formed on individual light sources in the projector of the modification 1.
Figure 22C:
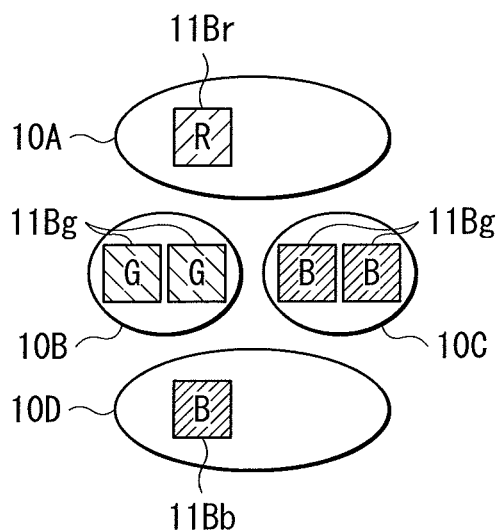
FIG. 22C schematically shows still another exemplary arrangement of light-emitting spots formed on individual light sources in the projector of the modification 1.

FIGS. 22A to 22C schematically show exemplary arrangements of light-emitting spots (R light-emitting spots 11Br, G light-emitting spots 11Bg, and B light-emitting spots 11Bb) formed on individual light sources in a projector of modification 1.

Referring to exemplary FIG. 22A, the solid-state light-emitting device 11 in the light source 10A has an R light-emitting spot 11Br. The device 11 in the light source 10B, which serves as the first light source, has two G light-emitting spots 11Bg and a B light-emitting spot 11Bb. Thus, according to the arrangement of the light-emitting spots of FIG. 22A, the device 11 in the light source 10B (first light source) has, in addition to the light-emitting spots for emitting the light beams of the same wavelength (G light-emitting spots 11Bg), the one or more light-emitting spots for emitting the light beams of different wavelengths from the same wavelength (B light-emitting spot 11Bb).

Referring to exemplary FIG. 22B, the solid-state light-emitting device 11 in the light source 10A has an R light-emitting spot 11Br. The device 11 in the light source 10B, which serves as the first light source, has two G light-emitting spots 11Bg and two B light-emitting spots 11Bb. Thus, according to the arrangement of the light-emitting spots of FIG. 22B, the device 11 in the light source 10B (first light source) has, in addition to the light-emitting spots for emitting the light beams of the same wavelength (G light-emitting spots 11Bg or B light-emitting spots 11Bb), the one or more light-emitting spots for emitting the light beams of different wavelengths from the same wavelength (two B light-emitting spots 11Bb or two G light-emitting spots 11Bg).

Referring to exemplary FIG. 22C, the solid-state light-emitting device 11 in the light source 10A has an R light-emitting spot 11Br. The device 11 in the light sources 10B and 10C, each of which serves as the first light source, have two G light-emitting spots 11Bg and two B light-emitting spots 11Bb, respectively. The device 11 in the light source 10D has a B light-emitting spot 11Bb. Note that the plurality of first light sources (two light sources 10B and 10C in this modification) are provided in the case of FIG. 22A.

As described above, the arrangement of the light-emitting spots which the light sources are provided with in the illumination optical system is not limited, and the colors or wavelengths of light beams from the light-emitting spots are not limited either. It is therefore possible to modify the arrangement of the light-emitting spots appropriately in accordance with an application or requirement. Even if the arrangement is modified, the behaviors of a projector having this arrangement are not changed. It is therefore possible for the projector to provide the same effects as the projectors of the embodiments do.

Modification 2

Figure 23:
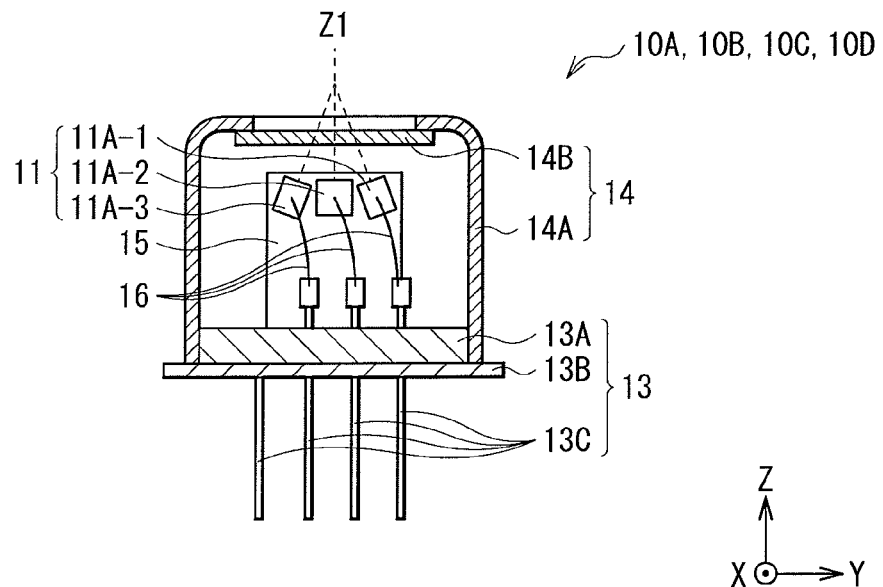
FIG. 23 shows a cross section of an exemplary structure of a light source in the projector of modification 2.

FIG. 23 shows a cross section of an exemplary structure of a light source (one of the light sources 10A, 10B, 10C, and 10D) in a projector of modification 2. A light source of this modification differs from the light sources of the embodiments in that at least one of the chips 11A is disposed in a slanting direction to an optical axis Z1 in the second light source. Specifically, in this figure, among laser chips 11A-1, 11A-2, and 11A-3, the chips 11A-1 and 11A-2 are disposed in a slanting direction to the optical axis Z1. In contrast to the chips 11A-1 and 11A-2, the chip 11A-2 is positioned parallel to the optical axis Z1. Accordingly, the light beam from the chip 11A-2 travels parallel to the optical axis Z1, while those from the chips 11A-1 and 11A-3 travel at any angles with respect thereto. Thus, in the modification, when the respective optical paths of the light beams from the chips 11A-1, 11A-2, and 11A-3 are unified to a single beam, the intensity of the single light beam is peaked on the optical axis Z1.

Figure 24:
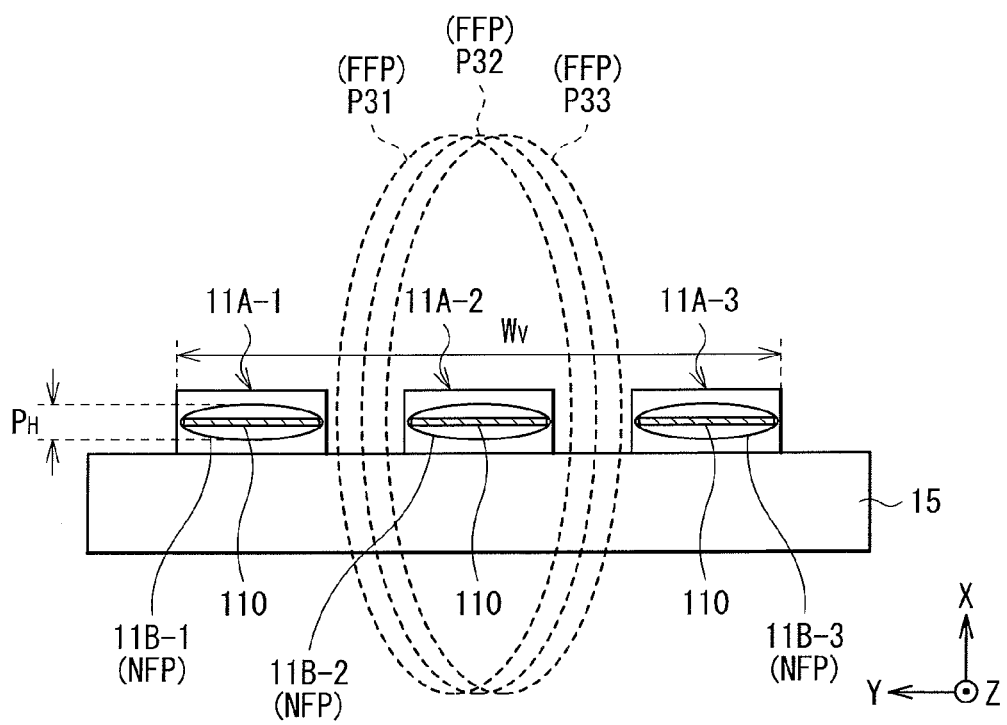
FIG. 24 shows an exemplary relationship of an arrangement and FFPs of light-emitting spots formed on a light source in the projector of FIG. 23.

Even in this modification, as shown in exemplary FIG. 24, it is preferable that the minor axes of FFPs of the laser beams from the light-emitting spots 11B-1, 11B-2, and 11B-3 on the chips 11A-1, 11A-2, and 11A-3, respectively be substantially aligned with the minor axis (Y axis in this modification) on a plane perpendicular to the optical axis of the integrator 40. Furthermore, if the light source of this modification serves as the second light source, that is, this light source emits light beams of two or more different wavelengths, then it is preferable that the major axes (X axis in this modification) of FFPs of the light beams having the different wavelengths among the light beams from all the light-emitting spots 11B-1, 11B-2, and 11B-3 be substantially aligned with each other.

Modification 3

Figure 25:
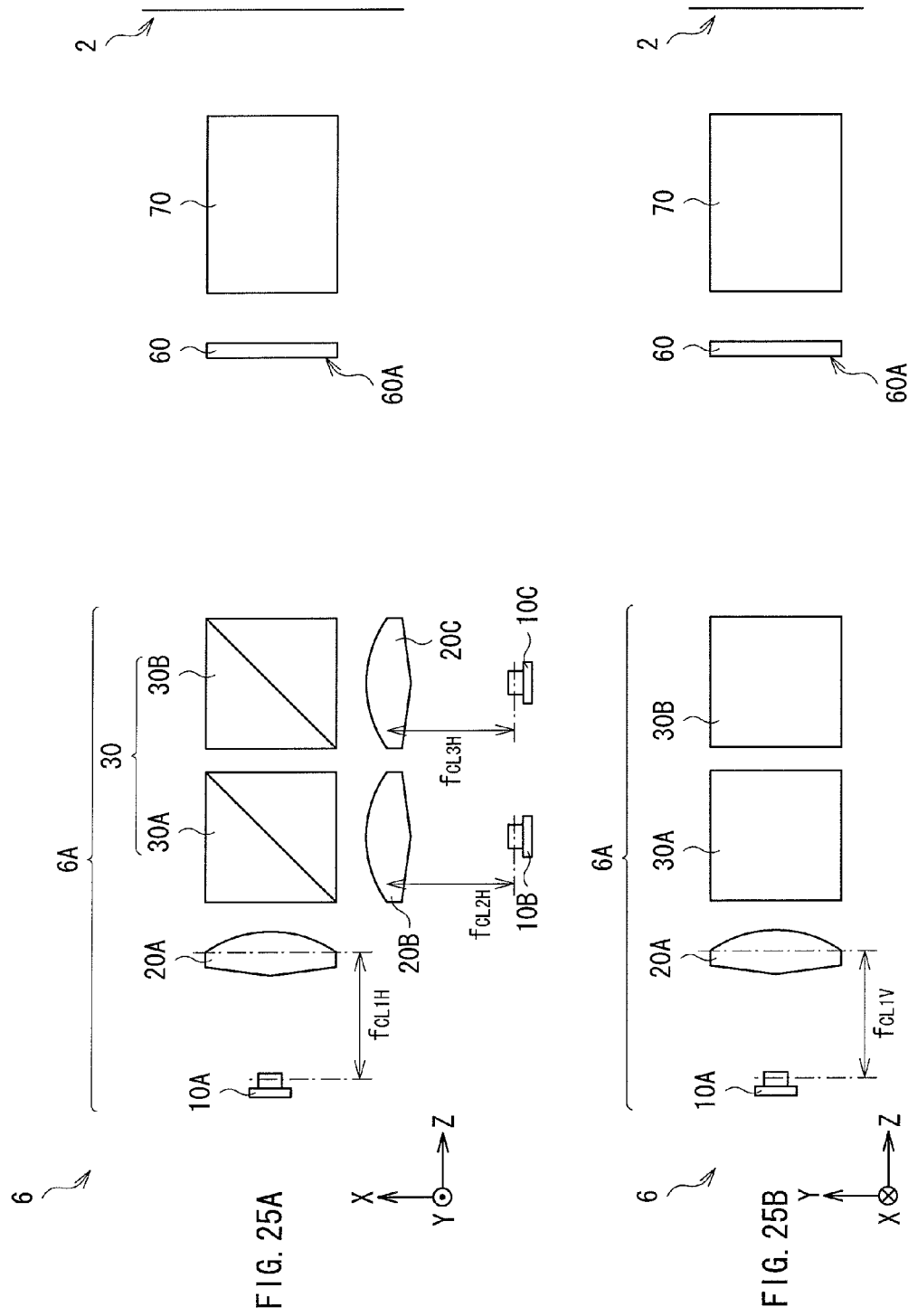
FIG. 25A shows a schematic structure of a projector of modification 3 as seen from the above.
FIG. 25B shows the schematic structure of the projector of the modification 3 as seen from one side.

FIGS. 25A and 25B show a schematic structure of a projector of modification 3 (called a "projector 6" herein). Note that this projector 6 corresponds to a concrete example of the "projection display unit" according to one embodiment of the technology. FIG. 25A shows the schematic structure of the projector 6 as seen from the above or the Y axis, and FIG. 25B shows it as seen from one side or the X axis.

The structure of the projector 6 differs from that of the projector 1 of the first embodiment in the illumination optical system. Concretely, the projector 6 includes an illumination optical system 6A. Accordingly, a description of the projector 6 will be mainly focused on different points from the projector 1, and the same points will be omitted as deemed appropriate.

The structure of the illumination optical system 6A in the projector 6 is equivalent to that of the illumination optical system 1A in the projector 1, if the integrator 40 and the condenser lens 50 are removed from the projector 1. In other words, the illumination optical system 6A is constituted by the light sources 10A, 10B, and 10C, the coupling lenses 20A, 20B and 20C, and the optical path unifying device 30.

As described above, the integrator 40 and the condenser lens 50 are options and may be removed from the illumination optical system 1A as necessary.

Other Modifications

Up to this point, the explanation has been given of the embodiments and modifications of the technology. However, the technology is not limited thereto, and it is possible to conceive various modifications and variations of them.

In the above embodiments, any of the illumination optical systems 1A, 3A, 4A, and 5A employs an infinity optical system in which the collimated light beam is incident on the fly-eye lens 40A. However, the illumination optical systems are not limited to this structure. Alternatively, any of the illumination optical systems 1A, 3A, 4A, and 5A may employ a finite optical system in which a convergent or divergent light beam is incident on the fly-eye lens 40A, instead of the infinity optical system. Specifically, traveling-direction angle conversion devices which have a function of converging or diverging the light beams from the light sources 10A to 10D may be provided in any of the illumination optical systems 1A, 3A, 4A, and 5A of the embodiments, instead of the coupling lens 20A to 20D, respectively. In this case, it is preferable that the optical magnification of an optical system including the traveling-direction angle conversion devices and the fly-eye lenses 40A and 40B be set such that the sizes of the light source images S which the cells 41 of the fly-eye lens 40A forms on the fly-eye lens 40B are not larger than the sizes of the corresponding cells 42 of the fly-eye lens 40B. In other words, it is preferable that the optical magnification of the optical system including the traveling-direction angle conversion devices and the fly-eye lenses 40A and 40B have a relationship defined by the following equation. Moreover, it is preferable that if the cells 41 and 42 of the fly-eye lenses 40A and 40B have an aspect ratio other than 1, then the illumination optical system 1A, 3A, 4A, and 5A employ the anamorphotic optical system.

$$h = P \times m \leq h_{FEL2}$$

where m denotes optical magnification of an optical system including the traveling-direction angle conversion devices and the fly-eye lenses 40A and 40B.

Figure 26:
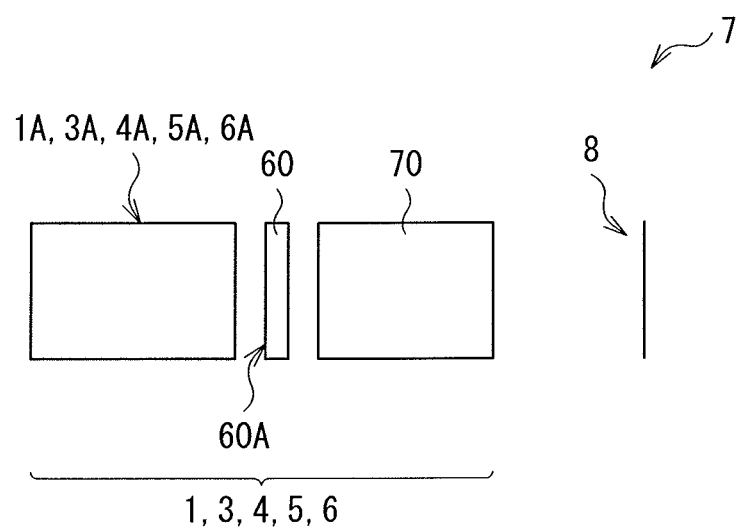
FIG. 26 shows a schematic structure of a rear projection display device equipped of the illumination optical system according to any one of the embodiments and the modifications.

In the above embodiments, the illumination optical systems 1A, 3A, 4A, 5A and 6A are applied to the projection display unit. However, the illumination optical systems 1A, 3A, 4A, 5A and 6A are applicable to other display devices. For example, as shown in FIG. 26, any of the illumination optical systems 1A, 3A, 4A, 5A and 6A is applicable to a rear-projection display device 7. This rear-projection display device 7 includes any of the projectors 1, 3, 4, 5, and 6 having the illumination optical systems 1A, 3A, 4A, 5A, and 6A, respectively and a transmissive screen 8 on which optical images to be projected by the projection optical system 70 are displayed.

As described above, by applying any of the illumination optical systems 1A, 3A, 4A, 5A, and 6A to the illumination optical system in the rear-projection display device 7, the luminance of the illumination light as a whole and the optical images is increased.

In the above embodiments, the spatial modulation device 60 is implemented by a light-transmitting or reflective device. However, the spatial modulation device 60 may be a digital micro-mirror device.

In the above embodiments, the explanation has been given of the components (optical systems) constituting the illumination optical systems and the display devices by using their concrete examples. However, the illumination optical systems and the display devices do not need to include all the optical components or may further include one or more additional components.

In the above embodiment, the illumination units are applied to the projection display units. However, the application of the illumination units is not limited to projection display units. Alternatively, it may be applied to exposure devices such as steppers.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An illumination unit comprising:
one or more light sources each including a solid-state light-emitting device including a package and at least one chip mounted on the package, each chip configured to emit a light beam as a light-emitting spot; and
an optical member having a minor axis and a major axis, and allowing incident light from the solid-state light-emitting device to pass therethrough,
wherein a total of at least three of the light-emitting spots are provided within the whole of the one or more light sources, to allow the whole of one or more light sources to emit light beams in two or more wavelength bands different from one another, wherein the solid-state light emitting device in a first one of the light sources includes a plurality of the chips mounted on the same package, each of the chips emitting light in the same wavelength band, wherein at least one chip of at least one of the light sources includes a laser diode, wherein a second one of the light sources includes a plurality of light-emitting spots and includes a chip including the laser diode, and wherein the second light source is configured to emit light beams of two or more different wavelengths, and wherein directions of major axes of the far field patterns of the light beams of two or more different wavelengths are substantially aligned with each other.

2. The illumination unit according to claim 1, wherein the solid-state light emitting device in the first light source further includes one or more light-emitting spots each emitting light in a wavelength band different from the same wavelength band.

3. The illumination unit according to claim 1, wherein the optical member includes:
one or more traveling-direction angle conversion devices, each converting a traveling-direction-angle of the light entering from the solid-state light-emitting device; and
an integrator having a minor axis and a major axis and uniformalizing illumination distribution in a predetermined illumination region which is to be illuminated by light from the traveling-direction angle conversion device.

4. The illumination unit according to claim 1, wherein at least one of the chips made of the laser diodes in the second light source is disposed in a slanting direction to an optical axis of the second light source.

5. The illumination unit according to claim 1, further comprising:
one or more traveling-direction angle conversion device each converting a traveling-direction-angle of the light entering from the solid-state light-emitting device; and
an integrator uniformalizing illumination distribution in a predetermined illumination region which is to be illuminated by light from the traveling-direction angle conversion device.

6. The illumination unit according to claim 5, wherein the integrator includes a first fly-eye lens having cells which receive light from the traveling-direction angle conversion device, and a second fly-eye lens having cells which receive light from the first fly-eye lens, and
an optical system configured with the traveling-direction angle conversion device and the first and second fly-eye lenses has an optical magnification which allows each of light source images to have a size not exceeding a size of the cell in the second fly-eye lens, the light source images being formed on the second fly-eye lens by the respective cells in the first fly-eye lens.

7. The illumination unit according to claim 6, wherein the optical magnification of the optical system satisfies the following expression:

$$h = P \times m \leq h_{FEL2}$$

where h is the size of the light source image,
P is a size of the light emission region, the size being equal to a size of a light-emission spot of the chip when the solid-state light-emitting device is configured of one chip, and the size being equal to a size of an enclosure which encloses light-emission spots of all chips with a minimum inner area when the solid-state light-emitting device is configured of a plurality of chips,
m is the optical magnification of the optical system, and
$h_{FEL2}$ is the size of the cell in the second fly-eye lens.

8. The illumination unit according to claim 6, wherein
the first fly-eye lens is disposed substantially in a focal position of the second fly-eye lens, and
the second fly-eye lens is disposed substantially in a focal position of the first fly-eye lens.

9. The illumination unit according to claim 1, wherein for each package the solid-state light-emitting device is mounted on a substrate.

10. The illumination unit according to claim 1, wherein each of the chips includes at least one of a light-emitting diode, an organic EL device, and a laser diode.

11. A projection display unit comprising:
an illumination optical system;
a spatial modulation device modulating light from the illumination optical system based on an input picture signal to generate imaging light; and
a projection optical system projecting the imaging light generated by the spatial modulation device,
the illumination optical system including one or more light sources each including a solid-state light-emitting device including a package and at least one chip mounted on the package, each chip configured to emit a light beam as a light-emitting spot, and an optical member having a minor axis and a major axis, and allowing incident light from the solid-state light-emitting device to pass therethrough,
wherein a total of at least three of the light-emitting spots are provided within the whole of the one or more light sources, to allow the whole of one or more light sources to emit light beams in two or more wavelength bands different from one another,
wherein the solid-state light emitting device in a first one of the light sources includes a plurality of the chips mounted on the same package, each of the chips emitting light in the same wavelength band,
wherein at least one chip of at least one of the light sources includes a laser diode,
wherein a second one of the light sources includes a plurality of light-emitting spots and includes a chip including the laser diode, and
wherein the second light source is configured to emit light beams of two or more different wavelengths, and
wherein directions of major axes of the far field patterns of the light beams of two or more different wavelengths are substantially aligned with each other.

12. A direct view display unit comprising:
an illumination optical system;
a spatial modulation device modulating light from the illumination optical system based on an input picture signal to generate imaging light;
a projection optical system projecting the imaging light generated by the spatial modulation device; and
a transmissive screen displaying the imaging light projected from the projection optical system,
the illumination optical system including one or more light sources each including a solid-state light-emitting device including a package and at least one chip mounted on the package, each chip configured to emit a light beam as a light-emitting spot, and an optical member having a minor axis and a major axis, and allowing incident light from the solid-state light-emitting device to pass therethrough, wherein a total of at least three of the light-emitting spots are provided within the whole of the one or more light sources, to allow the whole of one or more light sources to emit light beams in two or more wavelength bands different from one another, wherein the solid-state light emitting device in a first one of the light sources includes a plurality of the chips mounted on the same package, each of the chips emitting light in the same wavelength band, wherein at least one chip of at least one of the light sources includes a laser diode, wherein a second one of the light sources includes a plurality of light-emitting spots and includes a chip including the laser diode, and wherein the second light source is configured to emit light beams of two or more different wavelengths, and wherein directions of major axes of the far field patterns of the light beams of two or more different wavelengths are substantially aligned with each other.

* * * * *